(12) United States Patent
Guniguntala et al.

(10) Patent No.: US 10,944,816 B2
(45) Date of Patent: Mar. 9, 2021

(54) APPLICATION PLACING AND SCALING

(71) Applicant: International Business Machines Corporation, Armonk, NY (US)

(72) Inventors: Dinakar Guniguntala, Bangalore (IN); Deepthi Sebastian, Bangalore (IN); Sudip Karmakar, Bangalore (IN); Kabir Islam, Bangalore (IN); Suman Mitra, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/447,475

(22) Filed: Jun. 20, 2019

(65) Prior Publication Data

US 2020/0404051 A1 Dec. 24, 2020

(51) Int. Cl.
*H04L 29/08* (2006.01)
*H04L 12/26* (2006.01)
*H04L 12/24* (2006.01)

(52) U.S. Cl.
CPC ...... *H04L 67/1036* (2013.01); *H04L 41/5019* (2013.01); *H04L 43/08* (2013.01); *H04L 67/1004* (2013.01); *H04L 67/1029* (2013.01); *H04L 67/1031* (2013.01)

(58) Field of Classification Search
CPC .............. H04L 41/5019; H04L 43/08; H04L 67/1004; H04L 67/1029; H04L 67/1031; H04L 67/1036
See application file for complete search history.

(56) References Cited

U.S. PATENT DOCUMENTS

| 9,071,613 | B2 | 6/2015 | Bailey |
| 9,229,771 | B2 | 1/2016 | Armour |
| 9,454,408 | B2* | 9/2016 | Dutta .................. H04L 41/0823 |
| 9,519,469 | B2* | 12/2016 | Li ........................... G06F 11/34 |

(Continued)

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Thomas J Dailey
(74) *Attorney, Agent, or Firm* — Christopher Pignato, Esq.; George Blasiak, Esq.; Heslin Rothenberg Farley & Mesiti P.C.

(57) ABSTRACT

Methods, computer program products, and systems are presented. The method computer program products, and systems can include, for instance: obtaining from a plurality of computing environments computing environment characterizing data; obtaining application parameter data defined by an application provider, the application parameter data specifying attributes of an application component group defining an application, wherein the application parameter data includes group membership specifying data that specifies that certain application components are to be deployed as a group in a common computing environment; determining, in dependence on data of the computing environment characterizing data and data of the application parameter data, a set of computing environments for deployment of the application component group, and a placement ratio for the application component group.

20 Claims, 10 Drawing Sheets

(56) References Cited

U.S. PATENT DOCUMENTS

| | | | |
|---|---|---|---|
| 9,781,194 B2 | 10/2017 | Clarke | |
| 2011/0258621 A1 | 10/2011 | Kern | |
| 2012/0304179 A1 | 11/2012 | Devarakonda et al. | |
| 2012/0324114 A1* | 12/2012 | Dutta | H04L 29/08144 709/226 |
| 2013/0304788 A1* | 11/2013 | DeLuca | G06F 8/61 709/201 |
| 2014/0068075 A1* | 3/2014 | Bonilla | H04L 41/12 709/226 |
| 2015/0372936 A1* | 12/2015 | Kasso | H04L 47/70 709/226 |
| 2017/0134519 A1 | 5/2017 | Ping | |
| 2019/0250949 A1* | 8/2019 | Chen | G06F 9/505 |
| 2019/0363905 A1* | 11/2019 | Yarvis | G06F 8/60 |

OTHER PUBLICATIONS

Anonymous, "*Autoscaling in Multi-Cloud Environments*" https://elastisys.com/2015/11/09/autoscaling-in-multi-cloud-environments/ Nov. 9, 2015.

Anonymous, "*WebScale Architecture*" https://www.webscale.com/products/architecture/, Accessed Oct. 30, 2019.

\* cited by examiner

APPLICATION PLACING AND SCALING

BACKGROUND

Embodiment herein relate generally to applications and specifically to placing and scaling of applications.

There are a plurality of cloud based computing environment providers on the market today, each of them offering specific services with service levels, targeting specific use cases, groups of clients, vertical and geographic markets. These cloud providers compete with services of traditional IT service providers which are operated typically in on-premise environments of client owned datacenters. While cloud providers seem to have advantages over said company-owned datacenters, they are not under direct control of the client companies and there is a substantial risk of failure to provide agreed service levels. Furthermore, cloud service providers might change their service levels, prices, and service offerings more often than traditional on-premise (owned by the service consumer) information technology providers.

With the advent of cloud computing the information technology industry has been undergoing structural changes. These changes not only affect information technology companies themselves, but also the industry in general for which information technology has become an essential part of their business operations. IT departments face the need of providing infrastructure faster, driven by their lines of business, internal clients, suppliers and external customers. On the other hand, the pressure on cost effectiveness and quality of service continue to be very high. A high level of security is of utmost importance. Cloud computing environments have to fulfill similar requirements as traditional data centers in this regard, but are perceived to provide services faster and cheaper, and to have virtually endless resources available.

SUMMARY

Shortcomings of the prior art are overcome, and additional advantages are provided, through the provision, in one aspect, of a method. The method can include, for example: obtaining from a plurality of computing environments computing environment characterizing data; obtaining application parameter data defined by an application provider, the application parameter data specifying attributes of an application component group defining an application, wherein the application parameter data includes group membership specifying data that specifies that certain application components are to be deployed as a group in a common computing environment; determining, in dependence on data of the computing environment characterizing data and data of the application parameter data, a set of computing environments for deployment of the application component group, and a placement ratio for the application component group, wherein the placement ratio specifies a limit of a number of instances of an application component group on respective computing environments of the set of computing environments; deploying the application component group on the determined set of computing environments, wherein the deploying includes sending to the determined set of computing environments command data that specifies the determined placement ratio; iteratively obtaining, subsequent to the deploying, application performance monitoring data from the determined set of computing environments of the plurality of computing environments in which instances of the application component group have been deployed; and iteratively adjusting the placement ratio for the application component group between computing environments of the determined set of computing environments in dependence on the iteratively obtained monitoring data.

In another aspect, a computer program product can be provided. The computer program product can include a computer readable storage medium readable by one or more processing circuit and storing instructions for execution by one or more processor for performing a method. The method can include, for example: obtaining from a plurality of computing environments computing environment characterizing data; obtaining application parameter data defined by an application provider, the application parameter data specifying attributes of an application component group defining an application, wherein the application parameter data includes group membership specifying data that specifies that certain application components are to be deployed as a group in a common computing environment; determining, in dependence on data of the computing environment characterizing data and data of the application parameter data, a set of computing environments for deployment of the application component group, and a placement ratio for the application component group, wherein the placement ratio specifies a limit of a number of instances of an application component group on respective computing environments of the set of computing environments; deploying the application component group on the determined set of computing environments, wherein the deploying includes sending to the determined set of computing environments command data that specifies the determined placement ratio; iteratively obtaining, subsequent to the deploying, application performance monitoring data from the determined set of computing environments of the plurality of computing environments in which instances of the application component group have been deployed; and iteratively adjusting the placement ratio for the application component group between computing environments of the determined set of computing environments in dependence on the iteratively obtained monitoring data.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining from a plurality of computing environments computing environment characterizing data; obtaining application parameter data defined by an application provider, the application parameter data specifying attributes of an application component group defining an application, wherein the application parameter data includes group membership specifying data that specifies that certain application components are to be deployed as a group in a common computing environment; determining, in dependence on data of the computing environment characterizing data and data of the application parameter data, a set of computing environments for deployment of the application component group, and a placement ratio for the application component group, wherein the placement ratio specifies a limit of a number of instances of an application component group on respective computing environments of the set of computing environments; deploying the application component group on the determined set of computing environments, wherein the deploying includes sending to the determined set of computing environments command data that specifies the determined placement ratio; iteratively obtaining, subsequent to the deploying, application performance monitoring data from the determined set of computing environments of the plurality of computing environments in which instances of the application component group have been deployed; and iteratively adjusting the placement ratio for the application component group between computing environments of the determined set of computing environments in dependence on the iteratively obtained monitoring data.

There is set forth herein a method, the method comprising: obtaining from a plurality of computing environments computing environment characterizing data; obtaining application parameter data defined by an application provider, the application parameter data specifying attributes of an application component group defining an application, wherein the application parameter data includes group membership specifying data that specifies that certain application components are to be deployed as a group in a common computing environment; determining, in dependence on data of the computing environment characterizing data and data of the application parameter data, a set of computing environments for deployment of the application component group, and a placement ratio for the application component group, wherein the placement ratio specifies a limit of a number of instances of the application component group on respective computing environments of the set of computing environments; and deploying the application component group on the determined set of computing environments, wherein the deploying includes sending to the determined set of computing environments command data that specifies the determined placement ratio.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
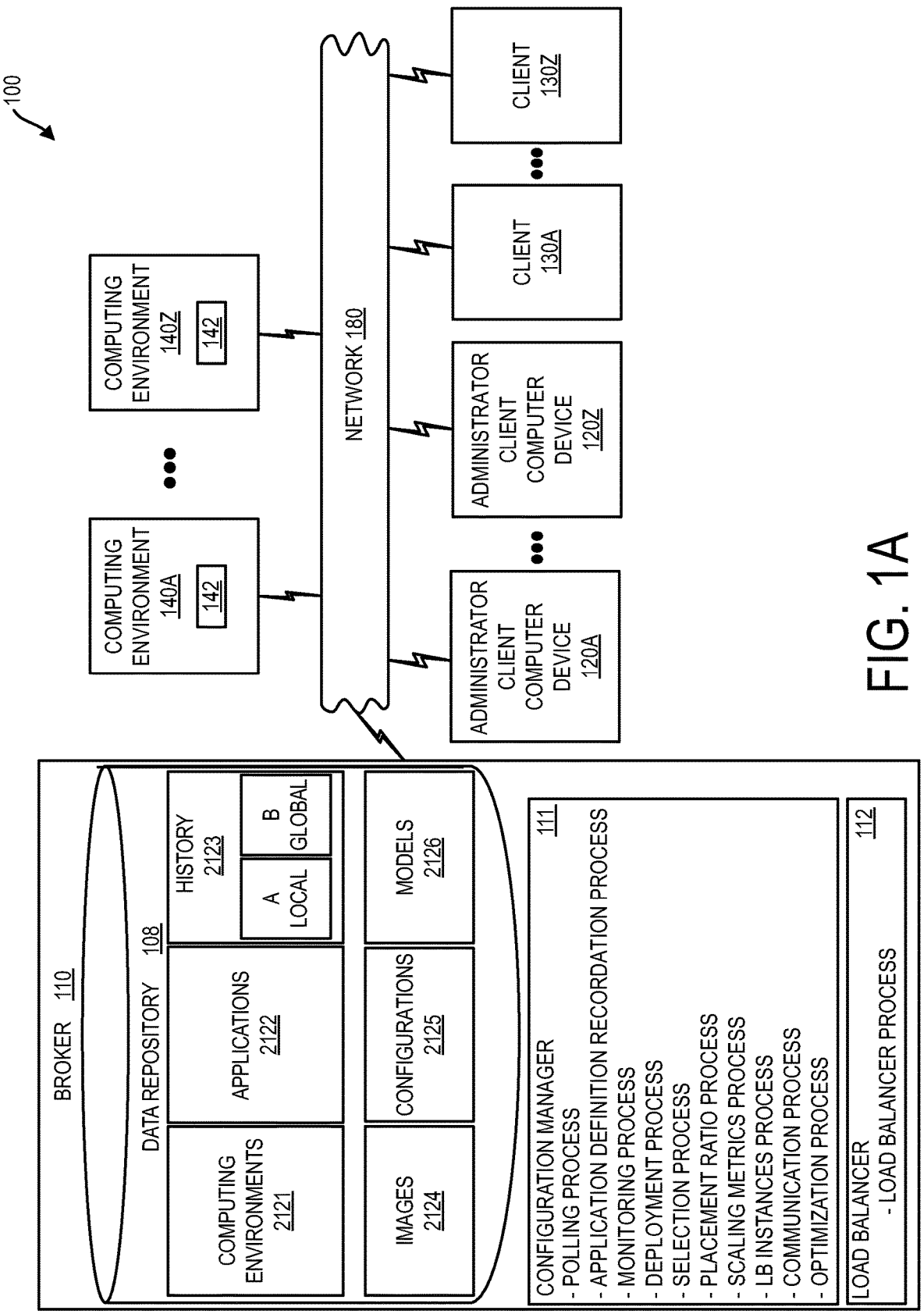
FIG. 1A depicts a system having a broker, administrator client computer devices, clients and computing environments according to one embodiment.

System 100 for placing instances of application components between different computing environments is illustrated in FIG. 1A. System 100 can include broker 110 having an associated data repository 108, administrator client computer devices 120A-120Z, clients 130A-130Z, and computing environments 140A-140Z. Broker 110, administrator client computer devices 120A-120Z, clients 130A-130Z, and computing environments 140A-140Z can be in communication with one another via network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

Referring to further aspects of system 100, administrator client computer devices 120A-120Z can be associated to different respective application providers which application providers are desirous of having their applications hosted by computing environments such as computing environments 140A-140Z Administrator client computer devices 120A-120Z can present respective administrator client user interfaces that prompt an administrator user to specify various application definition parameters. An administrator user interface provided by an administrator client computer device can be agnostic of any computing environment. A user interface presented by administrator client computer device 120A-120Z can be absent of any fields that require a user to input any data specific to any particular computing environment.

Broker 110 can be configured to have features to intelligently place application component groups amongst computing environments 140A-140Z and can have further features to establish a placement ratio for application component groups that have been placed and can further features so that placement of application component groups is dynamically optimized during a deployment period of an application component group.

Computing environments 140A-140Z of system 100 can be associated to respective computing environment providers. According to one embodiment, where computing environments 140A-140Z are configured as cloud computing environments computing environment providers associated to respective computing environments 140A-140Z, can be providers known as cloud services providers, e.g. IBM® CLOUD® cloud services, AMAZON® WEB SERVICES® (AWS®), or MICROSOFT® AZURE® cloud services (IBM® and IBM CLOUD are registered trademarks of International Business Machines Corporation, AMAZON®, AMAZON WEB SERVICES® and AWS® are registered trademarks of Amazon.com, Inc, and MICROSOFT® and AZURE® are registered trademarks of Microsoft Corporation.) Embodiments herein are described with reference to differentiated fictitious computing environment (cloud) providers such as ABC-CLOUD, ACME-CLOUD, MAGIC-CLOUD, and SUPERCONTAINER-CLOUD.

According to one embodiment, each of computing environments 140A-140Z can map to one computing environment provider and each computing environment provider can operate one computing environment of computing environments 140A-140Z. According to one embodiment, each of computing environments 140A-140Z can map to one computing environment provider and each computing environment provider can operate one or multiple computing environments of computing environments 140A-140Z. Computing environments 140A-140Z can have respective application program interfaces (APIs) 142 that allow characterizing parameters respecting the computing environments to be iteratively read by broker 110. In some cases, a computing environment provider can present a single API mapping to a single computing environment of computing environments 140A-140Z. According to one embodiment, a computing environment provider can present a plurality of different APIs each mapping to different computing environments of computing environments 140A-140Z. In such an embodiment, a single computing environment provider can make available one or computing environments 140A-140Z. In some instances, a computing environment of computing environments 140A-140Z can map and be provided by a single data center. In some other instances, e.g. where a computing environment provider maintains hidden data center granularity, a single computing environment of computing environments 140A-140Z associated to a single API can map to a plurality of data centers. In one embodiment, each computing environment 140A-140Z can have a respective API, from which characterizing data of the respective computing environment can be read and from which application performance data of live hosted applications can be read as well.

Data repository 108 of broker 110 can store various data. In computing environments database 2121 data repository 108 can store computing environment characterizing data that characterizes respective computing environments 140A-140Z. Computing environment characterizing data can include, e.g. services parameter values, scalability parameter values, cost, e.g. on a per instance basis, parameter values, (SLA) parameter values, e.g. response time parameter values, throughput parameter values, CPU usage parameter values, and availability parameter values. Broker 110 can be configured so that computing environment characterizing data stored in computing environment database 2121 is iteratively updated to reflect changes in respective computing environments. Computing environment Data repository 108 in applications database 2122 can store application definitions data on applications requested for placement by broker 110. Application definitions data can include user defined data that has been defined by an application provider. Applications data can include, e.g. application component group membership parameter values, cost/budget parameter values, user priority parameter values, scaling metrics parameter values, and restriction parameter values. An application component group membership parameter values can specify the group belonging of an application component. A maximum cost/budget parameter value can specify the total cost of an application. Priorities parameter values can specify performance characteristic preferences of a user. Performance characteristic preferences can be specified, e.g. in terms of cost, performance, security, or availability. Scaling metric parameter values can set forth user specified response time parameter values, throughput parameter values, and CPU usage parameter values. Restriction parameter values can specify, e.g. that an application is to be hosted only within a certain data center for example.

Data repository 108 in monitoring data history database 2123 can store live application performance data and can specify whether defined thresholds have been exceeded.

Data repository 108 in images area 2124 can store programming data images for instantiation of application components defining application component groups. Programming data images of images area 2124 can be received from application providers based on configuration data defined by administrator users of respective administrator client computer devices 120A-120Z.

Data repository 108 in configurations area 2125 can store data specifying a current configuration for hosting an application defined by one or more application component group (ACP) between multiple computing environments of computing environments 140A-140Z.

Broker 110 can include and can be defined by configuration manager 111 and load balancer 112. Configuration manager 111 can perform various processes including: (a) a polling process; (b) an application definition recordation process; (c) a monitoring process; (d) a deployment process; and (e) an optimization process. The aforementioned deployment process (d) can include, e.g. (i) a selection process; (ii) a placement ratio process; (iii) a scaling metrics process; and (iv) an LB instances process. Load balancer 112 can be defined by broker 110 running a load balancer process.

Configuration manager 111 running (a) a polling process can include configuration manager 111 receiving computing environment characterizing data from respective computing environments 140A-140Z and storing such received data into computing environments database 2121. Computing environment characterizing data can include, e.g. provider identification data, services data, configuration scalability, cost per instance data, SLA data, and/or date/time data.

Configuration manager 111 running (b) application definition recordation process can receive administrator user defined data received from various administrator client computer devices 120A-120Z for defining various applications. Received application definition data defined by administrator users associated to various application providers. Configuration manager 111 running application definition recordation process can receive application definition data from various administrator client computer devices 120A-120Z and store received data into applications database 2122 of data repository 108. Received application data can include, e.g. cost/budget parameter values, user priority parameter values, scaling metrics parameter values, and restriction parameter values. Received application definition data can include data that divides an application into a plurality of applications "application component groups" (application service groups).

Configuration manager 111 running (c) monitoring process can include configuration manager 111 monitoring live application performance data from computing environments 140A-140Z and storing received data into monitoring data history database 2123 of data repository 108. Configuration manager 111 running monitoring process can include configuration manager 111 comparing application performance parameters to thresholds associated to such application performance parameters and can raise flags in response to such thresholds being exceeded.

Configuration manager 111 running (d) deployment process can include configuration manager 111 deploying an application component group amongst one or more computing environments of computer environments 140A-140Z. Configuration manager 111 running deployment process can include configuration manager 111 running (i) a selection process in which configuration manager 111 selects a set of computing environments 140A-140Z for deployment of an application component group; (ii) a placement ratio process in which configuration manager 111 determines a placement ratio for application component groups amongst selected computing environments; (iii) scaling metrics process in which configuration manager 111 establishes specific scaling metrics for selected computing environments for deployment of an application group; and (iv) LB instances process can include configuration manager 111 establishing load balancing instances.

Configuration manager 111 running (e) optimization process can include configuration manager 111 optimizing selected computing environments for deployment of an application group and for dynamically optimizing a placement ratio for selected computing environments for hosting application component groups. Configuration manager 111 running optimization process can include configuration manager 111 examining status flags that may have been set by configuration manager 111 running (c) monitoring process.

Load balancer 112 can run (a) a load balancer process. According to one example of a load balancer process, load balancer can distribute incoming traffic amongst computing environments on which an application component group has been deployed.

Figure 1B:
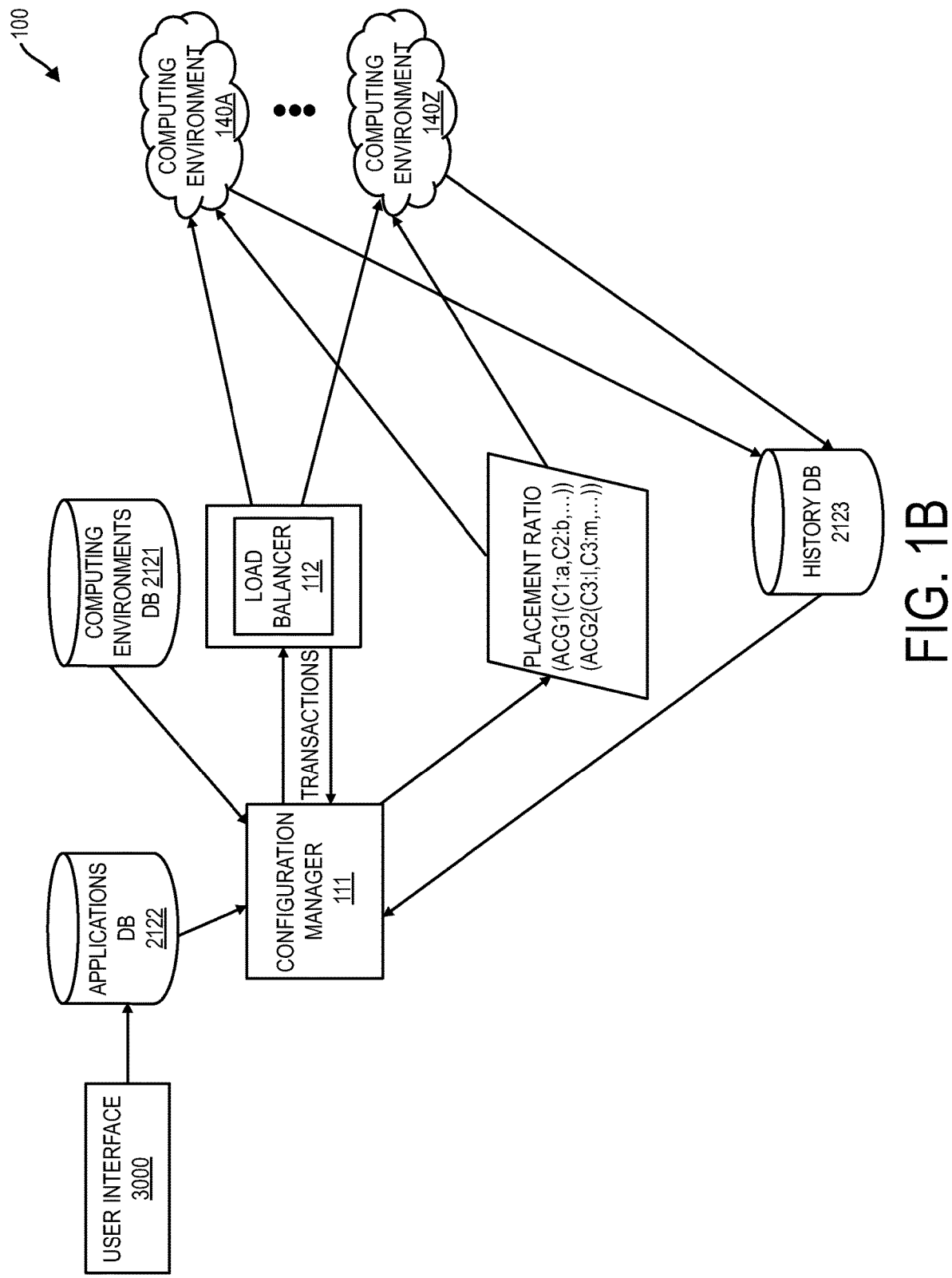
FIG. 1B depicts a system having a configuration manager a load balancer, an application provider user interface, and computing environments according to one embodiment.

FIG. 1B is a functional schematic diagram depicting system 100 as shown in FIG. 1A. Configuration manager 111 can use data from computing environments database 2121, applications database 2122 and history database 2123 to determine a set of computing environments of computing environments 140A-140Z for deployment of an applicant component group. Configuration manager 111 can use data of history database 2123 to adjust the determined set of computing environments for placement of an application component group, and to adjust a placement ratio of the application component group amongst the set of computing environments.

Figure 2:
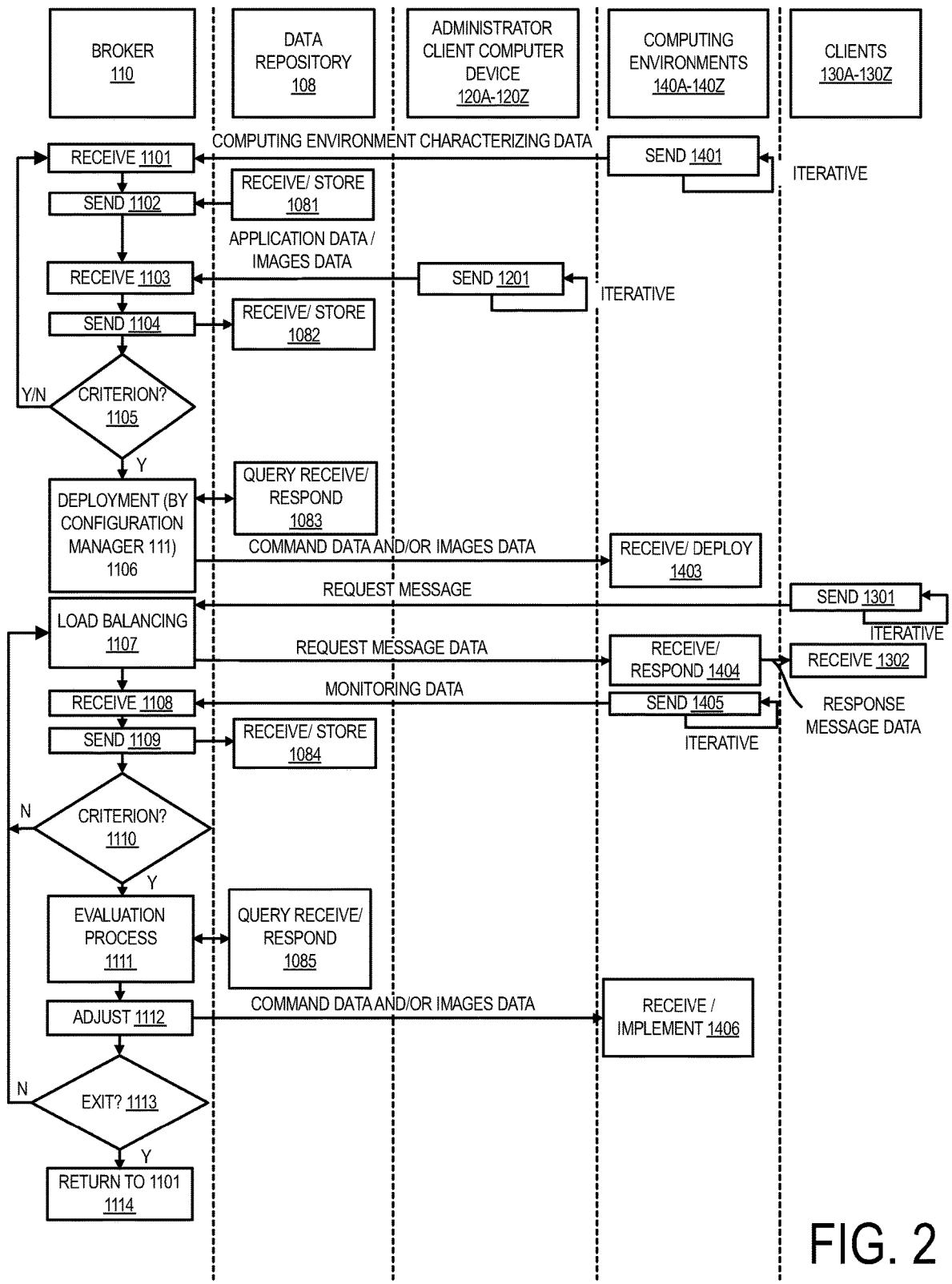
FIG. 2 is a flowchart illustrating a method for performance by a broker interoperating with administrator client computer devices, computing environments, and clients according to one embodiment.

Further aspects of system 100 are described in reference to the flowchart of FIG. 2, in which a method for performance by broker 110 interacting with administrator client computer devices 120A-120Z, clients 130A-130Z, and computing environments 140A-140Z.

At block 1101, broker 110 can receive computing environment characterizing data from computing environments 140A-140Z which can be sending computer environment characterizing data at block 1401. The computing environment characterizing data can include e.g. computing environment parameter values provided by identifiers for computing environments, services parameter values, scalability parameter values, cost (e.g. on a per instance basis) parameter values, (SLA) parameter values, e.g. response time parameter values, throughput parameter values, CPU usage parameter values, and availability parameter values, and data/time parameter values. At block 1102, on receipt of computing environment characterizing data, broker 110 can be sending data received at block 1101 to data repository 108 for receipt and storage by data repository 108 at block 1081 into computing environments database 2121.

A computing environments database 2121 according to one embodiment can be defined as set forth in Table 1 which includes details of various computing environment (e.g. cloud) providers, services offered, cloud specific configurations (e.g. scalability metrics, service specific functionality), cost options. Configuration manager 111 can use computing environments database 2121 for recommending the best possible options for placement of an application given a set of constraints by the user.

TABLE 1

(Computing Environment Data)

| Computing Environment (Cloud) Provider | Services | Config. | Cost (per instance basis) | SLA | Date/Time |
| --- | --- | --- | --- | --- | --- |
| ACME-CLOUD: US-West | DB: Mongo | Scaling Policy: CPU Usage > user value | Plan: Free ($0) | Uptime: 97% Response Time: 5 ms | 2018 Jan. 1 |
| ACME-CLOUD: US-West | DB: Mongo | Scaling Policy: Mem Usage > user value | Plan: Standard | Uptime: 99% Response Time: 4 ms | 2018 Jan. 1 |
| ACME-CLOUD: US-West | DB: Mongo | Scaling Policy: Reponse Usage > user value | Plan: Premium | Uptime: 99.99% Response Time: 4 ms | 2018 Jan. 1 |
| ACME-CLOUD: US-West | DB: Mongo | Scaling Policy: Reponse Usage > user value | Plan: Per second billing | Uptime: 99.999% Response Time: 3 ms | 2018 Jan. 1 |
| Further Example values for each col given below. | | | | Each Row will consist of individual values chosen from the examples below | |
| ACME-CLOUD: US-West | DB: Mongo DB: ElephantSQL DB: MySQL AI/ML: Tradeoff Telecom: Bulk SMS notification Runtimes: Java Security: Vulnerability Advisor Serverless: Lambda | Scaling Policy: CPU usage Scaling Policy: Mem usage Scaling Policy: Response Time Scaling Policy: Throughout SecurityPolicy: Strict SecurityPolicy: none | Plan: Free Plan: Base Plan: Standard Plan: Premium | Uptime in % Response Time in ms Throughout in tps (Transactions per second) | |

TABLE 1-continued (Computing Environment Data)

| Computing Environment (Cloud) Provider | Services | Config. | Cost (per instance basis) | SLA | Date/Time |
|---|---|---|---|---|---|
| ACME-CLOUD: US-West | IoT: End Point registration | | | | |
| MAGIC-CLOUD | Runtimes: .NET Runtimes: Java | | | Reponse Time: 8 ms | |
| ABC-CLOUD: London | DB: DB2 Security: Vulnerability Advisor Serverless: OpenWhisk SaaS: Weather Company Data | | | Uptime: 99.999% Response Time: 2 ms | |
| ABC-CLOUD: Dallas | AI/ML: ABC-AI SaaS: App Modernization | | | | |
| ABC-CLOUD Private (ICP) | DB: Mongo DB: Cloudant SaaS: Local DB access for internal only data SaaS: Employee Mail Server | | | | |
| SUPERCONTAINER-CLOUD | | | | | |

The computing environment characterizing data received at block 1101 and stored at block 1102 can include characterizing data that is in dependence on or in some cases independent of running applications. Characterizing data stored in computing environments database 2121 as defined by Table 1 can include data as indicated in Table 1, e.g. can include computing environment identifier parameter values, services parameter values, configuration parameter values, cost per instance parameter values, service level agreement parameter values, and timing data parameter values.

At block 1103 broker 110 can be receiving application definition data sent by administrator client computer devices 120A-120Z at block 1201. At block 1201, administrator client computer devices 120A-120Z can be sending data for receipt by broker 110 at block 1101. The data sent at block 1201 and received at block 1103 can include, e.g. application data such as parameter data and/or images data. The application parameter data can be user defined application parameter data. Administrator client computer devices 120A-120Z can be associated respectively with different application providers who are desirous of having their applications hosted by computing environments of computing environments 140A-140Z. In response to receipt of the user defined application data, broker 110 can proceed to block 1104. At block 1104, broker 110 can send the received application data to data repository 108 which can receive and store that application data at block 1082. Application data such as application parameter data received at block 1103 can be received from an administrator client computer device of an application provider in the form of e.g. JSON or YAML file and/or the application data can be entered into a user interface of an administrator client computer device. In response to completion of block 1104, broker 110 can proceed to block 1105.

The received application data stored in applications database 2122 of data repository 108 at block 1082 can include application parameter data as specified in Table 2 herein and can include, e.g. a maximum budget value, referenced to runtimes, prioritization parameter values, SLA parameter values, e.g. CPU utilization values, and restriction parameter values.

A User Input front-end (as shown in FIG. 1) for developers to specify runtimes, scalability options, priority options as well as provide the application to be hosted. It accepts the following inputs from the cloud application developer, and stores this data in the form of a user input table (Table 2) which can define applications database 2121:

TABLE 2

(Application Data)

| Application component group | Application Component | User Priorities | Scaling Metrics (start new instance if specified condition is satisfied) | Restrictions | Maximum Budget |
|---|---|---|---|---|---|
| ACG1 | AC1 (Java) | Uptime >= 99% | CPU Usage > 80% | US Geo + Any Cloud | $10 pm |
| ACG1 | AC2 (ABC-AI Service) | Uptime >= 99.99%, Response Time <= 5 ms | Response Time > 3 ms or memory usage > 85% | US Geo + Any Cloud | $75 pm |

TABLE 2-continued (Application Data)

| Application component group | Application Component | User Priorities | Scaling Metrics (start new instance if specified condition is satisfied) | Restrictions | Maximum Budget |
|---|---|---|---|---|---|
| ACG1 | AC3 (Cloudant DB) | Uptime >= 99.999%, Response Time <= 8 ms | Response Time > 5 ms | US Geo + Any Cloud | $50 pm |
| ACG2 | AC1 (node.js) | Response Time < 5 ms | Response Time > 2 ms | EU Geo + ABC-CLOUD | $15 pm |
| ACG2 | AC2 (NoSql DB) | Uptime >= 99.999%, Response Time <= 5 ms | Response Time > 3 ms | EU Geo + ABC-CLOUD | $15 pm |

Table 2 depicts that broker 110 can be configured to receive application definition data that defines one or more application component group. An applicant component group herein can include application parts of an application specified to be deployed together to a particular computing environment, e.g. cloud computing environment. Collected application data stored in applications area 2122 as defined by Table 2 can include such parameter values as application component group identifier parameter values, application component identifier parameter values, user priority parameter values, scaling metric parameter values, restriction parameter values, and maximum budget parameter values.

Referring to Table 2, user application according to one embodiment can have first and second application component groups (ACG1 and ACG2). ACG1 in the described example consists of a AC1 (A java app) that uses AC2 (ABC-AI service) and AC3 (Cloudant DB). These three components can be advantageously placed together on common computing environments, even though ACG1 instances can be deployed across several clouds based on other criteria. For example, if by processes herein configuration manager 111 determines that there are to be provided 10 instances of the ACG1, it can have 5 instances on the computing environment provided by cloud C1, 3 instances on the computing environment provided by cloud C2 and 2 instances on the computing environment provided by cloud C3. In the described example the computing environment provided by cloud C1 can have up to five instances each of AC1, AC2 and AC3 running (the number of actual instances that are running can be determined by the scaling metrics).

An application component group can include e.g. a group of services that are advantageously designated to be deployed and scaled together. An example of a group of services that can be deployed together and scaled together can include. e.g. (i) a web server service, (ii) an artificial intelligence (AI) service, (iii) an application instance such as a java program, (iv) a database server service. In some embodiments an application component group (ACG) can be defined by application components of different types.

According to one embodiment that is referenced in Table 2, consider a travel booking portal that provides services for (a) booking flights, and services for (b) booking hotels. Each of (a) and (b) can be provided in an application component group that can be advantageously deployed and scaled together. A user using a travel planning application will be booking both a flight and a hotel together will be interacting with different application component groups. The flight booking application component group can consist of services for viewing/booking/modifying/canceling flights as well as services that deal with various individual airlines. The hotel booking application component group can consist of services for viewing/booking/modifying/canceling hotel reservations as well as services that deal with various individual hotels.

The respective ACGs for (a) and (b) may have respective different performance and latency requirements, e.g. the flight ACG for (a) may have specified relatively lower latency and high performance to cater to the dynamic pricing whereas a hotel booking ACG requirements can be relatively relaxed. Accordingly, broker 110 can deploy the first ACG for (a) and the second ACG for (b) on different first and second sets of computing environments of computing environments 140A-140Z. The first and second sets of computing environments can have zero or more common members.

The application to be hosted (deployable runtime element/container), along with a list of runtimes and databases that it uses can be specified by a user and stored within applications database 2122 as defined by data as set forth in Table 2. The list of application components that the application is split up into and any component groupings for the application. The grouping information can be used to place and scale the components as a single entity. Example application component groups can include, e.g. ACG1=[AC1 (Java)+AC2 (ABC-AI)+AC3 (Cloudant DB)], ACG2=[AC1 (node.js)+AC2 (NoSql DB)].

User budget herein refers to the maximum cost per time period (week/month) for a particular service that the user can incur across all cloud placements for performance of the service. System 100 can be configured so that a user (application providers) can set user priorities indicated by priority parameter values of Table 2. For example, a user can select one or more of the following characteristics to be prioritized on any particular computing environment (e.g. cloud): (i) Performance (Response time, throughput), (ii) Security (security policies to be applied), (iii) Availability (Uptime percentage of the service), Cost (Maximum budget per month for the individual component/service).

System 100 can be configured so that a user can set user scaling metrics indicated by scaling metrics parameter values of Table 2. A user can specify service level agreement (SLA) parameter values for each of their application components in terms of the following scaling metrics parameter values: (i) a response time parameter value (e.g. If the response time exceeds a user specified value, then start a new instance), a throughput parameter value (if the throughput falls below a user specified value, start a new instance), a resource usage parameter value (If the resource (e.g. CPU or Memory) usage exceeds a user specified value, start a new instance).

System 100 can be configured so that a user can set user restrictions indicated by restrictions parameter values of Table 2. Restrictions that the user would like to apply to one or more application component group (ACG) that are part of an application can be specified as restrictions parameter values. A user can specify e.g. that one or more application component groups is required to be hosted on the same certain computing environment (e.g. cloud) (e.g. run only on IBM Bluemix, run only on a computing environment physically located in the US) etc.

Figure 3:
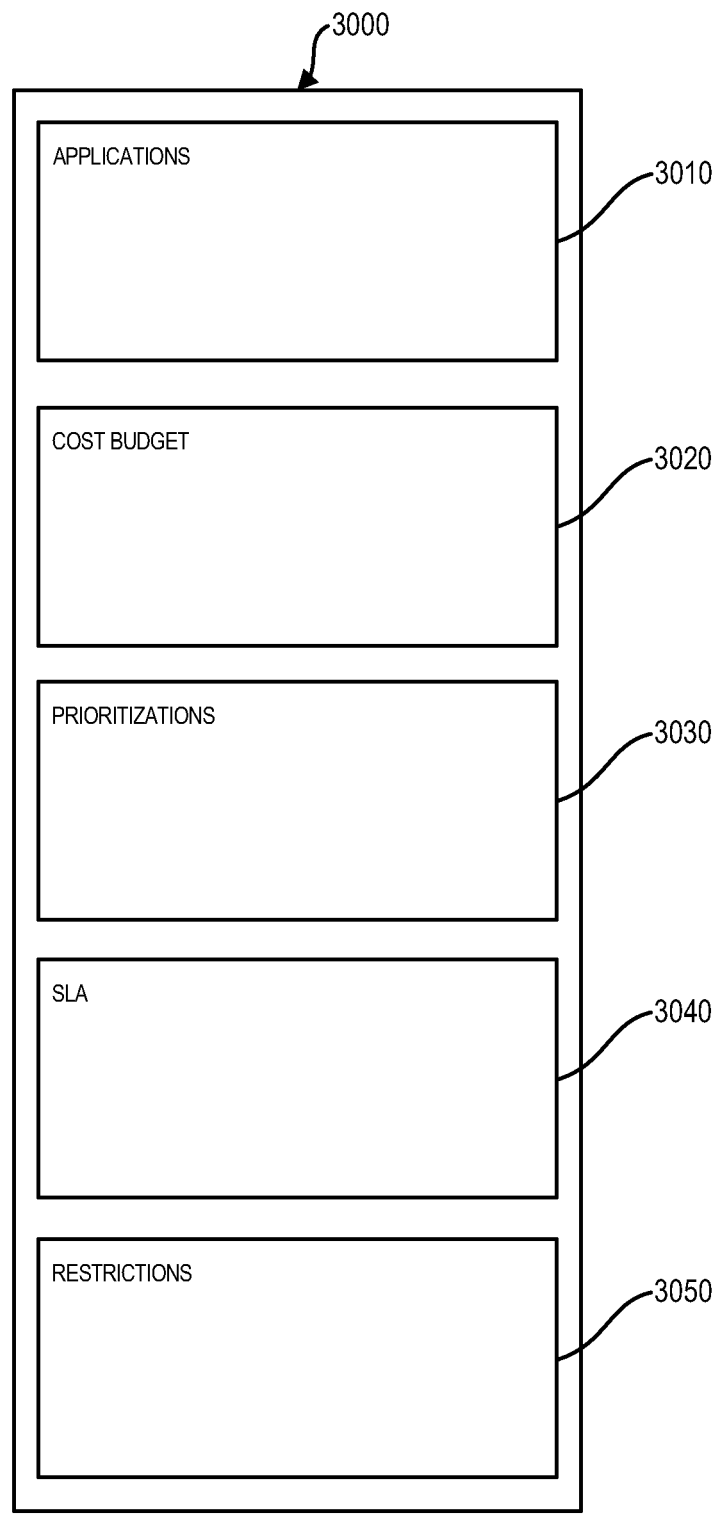
FIG. 3 depicts a user interface for display on an administrator client computer device according to one embodiment.

System 100 can be configured so that the Table 2 parameter values can be received from an application provider in the form of e.g. JSON or YAMI file in which the parameter values are specified. In addition or alternatively, parameter values can be entered into a user interface. An administrator user of an application provider can define parameter values with use of a user interface for display on a display of administrator client computer devices 120A-120Z such as user interface 3000 as shown in FIG. 3 which can be provided by a graphical user interface (GUI). User interface 3000 can include area 3010 for entry of application definition parameter values specifying e.g. application component group identifiers, and also using area 3010 can reference programming data images for instantiation of components. User interface 3000 can include area 3020 for entry of cost budget parameter values, area 3030 for specifying user priorities parameter values, area 3040 for specifying SLA parameter values, and area 3050 for specifying restrictions parameter values.

In response to completion of block 1104 broker 110 can proceed to block 1105 to examine one or more criterion determining whether an application component group (ACG) can be deployed. The one or more criterion can include e.g. that sufficient data characterizing the application has been received, contract settlement, timing criterion and the like. If the one or more criterion is satisfied at block 1105, broker 110 can advance to block 1106 to perform deployment. If the one or more criterion is not satisfied, broker 110 can return to block 1101 to iteratively receive computing environment data or application data until a criterion is satisfied. If the one or more criterion is satisfied at block 1105, broker 110 can simultaneously proceed to block 1106 and can return to block 1101 to iteratively receive computing environment data and/or application data until one or more criterion is satisfied.

At block 1106 broker 110 can deploy an application component group (ACG). For deployment of an application component group (ACG), broker 110 can identify a set of cloud environments from a plurality of candidate computing environments on which to deploy an Application component group. For deployment of an Application component group at block 1108, broker 110 can determine an initial placement ratio for a deployed application. For determination of a set of computing environments on which to deploy an application component group (ACG), and for determination of an initial placement ratio, broker 110 can perform multiple queries of data repository e.g. to examine data of computing environments database 2121 defined by Table 1 and applications database 2122 defined by Table 2. Deployment can include multiple queries of data repository 108 as indicated by query receive/respond block 1083 performed by data repository 108.

At block 1106, configuration manager 111 of broker 110 can perform a deployment process for deployment of an application component group. Configuration manager 111 performing deploying at block 1106 can include configuration manager 111 performing (i) a selection process in which configuration manager 111 selects a set of computing environments 140A-140Z for deployment of an application component group; (ii) a placement ratio process in which configuration manager 111 determines a placement ratio for application component groups amongst selected computing environments; (iii) scaling metrics process in which configuration manager 111 establishes specific scaling metrics for selected computing environments for deployment of an application group; (iv) LB instances process can include configuration manager 111 establishing load balancing instances; and (v) a communication process for sending command and/or images data to selected computing environments.

For deployment of an application component group at block 1106, broker 110 can send e.g. command data and/or images data to the selected computing environments of computing environments 140A-140Z at block. In response to receipt of the command data and/or images data received at block 1403, selected computing environments of computing environments 140A-140Z can run the application components defining the application component group at block 1403.

In response to completion of deployment at block 1108 broker 110 can proceed to blocks 1107-1113. Blocks 1107-1113 depict functions iteratively performed by broker 110 during a deployment of an application component group (ACG). Broker 110 can iteratively perform blocks 1107-1113 for a deployment period of an application component group.

At block 1107 broker 110 can be performing load balancing to balance loading attributable to client requests. At block 1301 clients 130A-130Z can be sending request messages which can be distributed amongst computing environments by load balancer 112 of broker 110 at block 1109. Broker 110 for performing load balancing can distribute request data received from clients 130A-130Z to computing environments according to a load balancing scheme e.g. a round robin load balancing scheme. With an application component group deployed at block 1106, broker 110 and selected computing environments of computing environments 140A-140Z are able to respond to client request messages defining client transactions initiated by clients 130A-130Z. At block 1301, clients 130A-130Z can be sending request messages to broker 110, which request messages can be received by load balancer 112. Broker 110 by load balancer 112 at block 1107 can be performing load balancing so that received request messages are directed to an appropriate one of a selected computing environment based on proper load balancing function, e.g. according to a round robin scheme in one embodiment. A correct computing environment, i.e., the proper computing environment as selected according to a load balancing scheme can receive a request message at block 1404 and can respond to a client sending the message with a response message data send at block 1404 and received by a client at block 1302. While performing load balancing, broker 110 at block 1108 can be receiving monitoring data.

At block 1108 broker 110 can be receiving live monitoring data from computing environments. In response to completion of block 1108 configuration manager 111 can proceed to block 1109 to send received monitoring data for storage into data repository 108. Illustrative monitoring data can be stored into local area A of monitoring data history database 2123. Configuration manager 111 can run a live monitoring process that continually tracks various parameters such as service reliability, SLA variance across time and cost per SLA metrics for every service across multiple computing environment (e.g. clouds). This data can be provided to configuration manager 111 and logged by configuration manager 111 into local area A of history database 2123 for future consumption.

At block 1108 broker 110 can be receiving live application performance monitoring data sent by computing environments 140A-140Z at block 1405. The monitoring data received at block 1108 can be monitoring data received from computing environments hosting applications of one or more application provider being managed by broker 110. At block 1109, broker 110 can send received computing environment characterizing data for receipt by data repository 108 at block 1084. At block 1084, data repository 108 can receive and store the described computing environment characterizing data. In response to completion of block 1109, broker 110 can proceed to block 1110.

Table 3 depicts monitoring data that can be stored in local area A of history database 2123 of data repository 108.

TABLE 3

| | | | | | | | |
|---|---|---|---|---|---|---|---|
| (Monitoring Data - Local Area A of Monitoring Data History Database) | | | | | | | |
| App Comp Group (ACG) | Current Computing Environment (e.g. Cloud) Running | App. Component | Current Cost Utilization | Cost Threshold (Calculated) | Current SLA (Request SLA - T2, Advertised SLA - T1) | Number of current Instances (Placement Ratio) | Current TPS (Max TPS from History) | Date/ Time |
| ACG1 | ACME-CLOUD: US-West | AC1 (Java) | $ 2.2 | $7 | Uptime = 97% (table 2: >=99% table 1: >=99%) | 5 (Max = 10) | 2000 (3500) | 1 Jan. 2018/ 11:00:00 |
| ACG1 | ACME-CLOUD: US-West | AC2 (ABC-AI) | $13.5 | $75 | Uptime = 99.99% (T2 >=99.99% T1 >=99.99%) Response time = 4 ms (T2: <=5 ms T1: <= 3 ms) | 3 (Max = 4) | 2000 (2000) | 1 Jan. 2018/ 11:00:00 |
| ACG1 | ACME-CLOUD: US-West | AC3 (Cloudant DB) | $37 | $40 | Uptime = 99.999% (T2: >=99.999% T1: >=99.999%) Response Time = 4 ms (T2 <=8 ms T1: <=5 ms) | 2 (Max = 3) | 700 (1000) | 1 Jan. 2018/ 11:00:00 |

As shown in Table 3 live application performance monitoring data can include such data in local area A of history database 2123 defined in one embodiment by Table 3 can include such parameter values as application component group (ACG) identifier parameter values, computing environment identifier parameter values, application component identifiers, current cost utilization parameter values, current SLA parameter values, number of current instances and current placement ratio parameter values, current transactions per second parameter values, and timing data parameter values. On receipt of the live application monitoring threshold data, broker 110 can send for storage into data repository 108 the received data. Data repository 108 can store the received data into local monitoring data history area A global monitoring data history area B of monitoring data history database 2123.

Broker 110 at block 1108 while receiving monitoring data from a first application component group of a first application provider running on a first set of computing environments can be supporting multiple application component groups from multiple application providers and can be receiving monitoring data from the plurality of application component groups. Configuration manager 111 can maintain a local area history database as represented in Table 3 for multiple application component groups of multiple application providers and at block 1111 can extract data from multiple local databases for storage into a global monitoring database defined by global monitoring data history area B of monitoring data history database 2123 of data repository 108. An example of a global area B of history database is shown in Table 4 below.

TABLE 4

(Monitoring Data - Global Area B of Monitoring Data History Database)

| Computing Environment (e.g. Cloud) | App. Component Classifier | Current Cost Utilization | Current SLA (Request SLA - T2, Advertised SLA - T1) | Max TPS from History | Date/Time |
|---|---|---|---|---|---|
| ACME-CLOUD: US-West | Java Runtime | $2.2 | Uptime = 97% (table 2: >= 99% table 1: >= 99%) | (3500) | 1 Jan. 2018/ 11:00:00 |
| ACME-CLOUD: US-West | ABC-AI Service | $13.5 | Uptime = 99.99% (T2 >= 99.99% T1 >= 99.99%) Response time = 4 ms (T2: <= 5 ms T1: <= 3 ms) | (2000) | 1 Jan. 2018/ 11:00:00 |
| ACME-CLOUD: US-West | Cloudant DB Service | $37 | Uptime = 99.999% (T2: >= 99.999% T1: >= 99.999%) Response time = 4 ms (T2: <= 8 ms T1: <= 5 ms) | (1000) | 1 Jan. 2018/ 11:00:00 |

Configuration manager 111 can maintain a global history area B of history database 2123. Global history area B of history database 2123 can include aggregated metrics across users (application providers who defined application component groups for deployment). For populating global area B of history database 2123, configuration manager 111 can copy data of local history area A of monitoring data history database 2123 defined by Table 3 while removing appropriate user specific data. A resulting global history area B of monitoring data history database 2123 can include such parameter values as depicted in Table 4 and can include e.g. computing environment identifier parameter values, application component type parameter values, current cost utilization parameter values, current SLA parameter values, max transaction per second (TPS) parameter values, and timing data parameter values. With global history area B established, configuration manager 111 can process global history area B to identify patterns of SLAs for specific services/runtimes/components that will then be fed back into computing environment specific SLA metrics as seen in Table 1.

Monitoring data history database 2123 can include local area A (specific to the current application) and global area B (storing data across all applications being hosted by all users via this service), subject to processing by configuration manager to enable configuration manager 111 to understand past and current trends and predict future fluctuations in usage.

According to one embodiment, configuration manager 111 can run processes to predict patterns of computing environments 140A-140Z. Predicted patterns can include predicted timing patterns according to one embodiment. According to one embodiment, configuration manager 111 can used data of global history area B to train a predictive model of predictive models area 2126. Referring to Table 4, configuration manager 111 can apply iterations of training datasets to a predictive model trained by supervised machine learning A result labeled data item of a training dataset can be a time period, and condition labeled data items of a training dataset can be provided by remaining performance parameter values of a row of data of the Global area B as defined by Table 4. The predictive model trained with the training datasets as described can learn behavior tendencies of computing environments at specific times, e.g., whether they will exhibit greater than acceptable range performance at specific times, or less than acceptable range performance at specific times. The specific times can be specific time periods, e.g. hourly time periods, daily time periods, weekly time periods, monthly time periods.

The predictive model of predictive models area 2126 once trained can be capable of responding to query data. Configuration manager 111 can query a predictive model once it is trained. In the described embodiment, configuration manager 111 can query a trained predictive model with query data that comprises timing data that defines a time period of interest combined with a certain computing environment identifier specifying a certain computing environment. The predictive model can thus respond with response that specifies a predicted performance characteristic for the time period of interest specified in the query (e.g. time period=13:00-14:00). The trained predictive model can return levels of confidence associated to predictions. Configuration manager 111 can iteratively query all trained models with query data to return large datasets for pruning According to one embodiment, configuration manager 111 can be configured to examine such a large dataset for identifying prediction specifying data items having an associated confidence levels exceeding a threshold, e.g. confidence >=0.95. The identified threshold confidence level exceeding data values can indicate strong performance patterns of computing environments 140A-140Z. Configuration manager 111 can store pattern data resulting from the identifying prediction specifying data items having an associated confidence levels exceeding a threshold into a Global Patterns table as indicated in Table 5.

TABLE 5

(Monitoring Data - Global Patterns)

| Computing Environment (Cloud) | Component | Factor | Time period | Value |
|---|---|---|---|---|
| ACME-CLOUD: US-West | Java Runtime | Uptime | Mon 9:00-14:00 | n > 97.99% |
| ACME-CLOUD: US-West | Java Runtime | Uptime | Sun 13:00-23:59 | n > 99.99% |
| ABC-CLOUD: Dallas | Cloudant DB | Cost | December | n < $80 pm |
| ABC-CLOUD: Dallas | Cloudant DB | Cost | July | n < $55 pm |
| ABC-CLOUD: London | ABC-AI Service | Response time | 9:30-11:00 (UTC) | n < 5 ms |
| ABC-CLOUD: London | ABC-AI Service | Response time | 22:30-04:30 (UTC) | n < 2 ms |

The global patterns Table 5, which defines a global patterns database defined by an area of data repository 108, specifies time based patterns that are predictions of performance of computing environments based on historical performance. The computing environment of the first row is predicted to exhibit an uptime performance characteristic of n>97.99% for the time period Mon 9:00-4:00. The computing environment of the second row is predicted to exhibit an uptime performance characteristic of n>99.99% for the time period Sun 13:00-23:59.

On completion of block 1109 broker 110 can proceed to block 1110. At block 1110, broker 110 can determine based on the evaluating at block whether one or more criterion has been satisfied for triggering of an optimization process. The one or more criterion examined at block 1110 can include a timing criterion.

For example, broker 110 can attempt to optimize a current configuration of computing environments, e.g. involving their placement ratios at timed intervals, e.g. once per hour, or upon the occurrence of a predetermined event for example. If the one or more criterion at block 1110 is not satisfied, broker 110 can return to iteratively perform the loop of blocks 1107-1110 until the criterion is satisfied. When the one or more criterion of block 1110 is satisfied, broker 110 can proceed to evaluation block 1111 and adjust block 1112 to perform an optimization process.

Broker 110 at blocks 1111 and 1112 can optimize a current configuration of computing environments of computing environments 140A-140Z hosting an application component group. For optimization of a hosting configuration, for example, broker 110 can, (a) add to a current set of computing environments hosting an application component group; (b) detract from a current set of computing environments hosting an application component group; and/or (c) adjust a placement ratio between selected computing environments hosting an application component group. Broker 110 performing evaluation process at block 1111 can include broker 110 examining recently received monitoring data received at block 1108 and stored by data repository 108 at block 1109. Broker 110 performing evaluating at block 1111 can include broker 110 examining historical data of both local area A and global area B of monitoring data history database 2123 of data repository 108. Evaluation at evaluation block 1111 can include multiple queries of data repository 108 as indicated by query receive/respond block 1085 performed by data repository 108.

Broker 110 on completion of block 1111 can proceed to block 1112. At block 1112, broker 110 can perform adjustment of a current placement ratio between selected computing environments. At block 1112 in some instances, broker 110 by configuration manager 111 can further delete a current computing environment or add to a set of computing environments currently costing an application component group.

Broker 110 at block 1112 can send command data and/or images data for receipt and implementation by appropriate computing environments of computing environments 140A-140Z at block 1406. At block 1406, the receiving computing environments can receive and implement command data and/or images data sent at block 1112. Broker 110 on completion of block 1112 can proceed to block 1113.

At block 1113, broker 110 can determine whether an exit condition has been satisfied. An exit condition can be, for example, a time period for deployment of an application component group has expired or that a total budget threshold has been exceeded. If an exit condition has not been satisfied, broker 110 can simply return to block 1107 and can iteratively perform the loop of blocks 1107-1113 and can iteratively optimize selected computing environments and a placement ratio until an exit condition is achieved at block 1113. When an exit condition is satisfied at block 1113, broker 110 can proceed to block 1114. At block 1114, broker 110 can return to block 1101 to receive new computing environment data and/or application data (which broker 110 can be performing at all times during deployment of system 100).

An example of broker 110 performing deploying at block 1106 is now described. For deploying an application component group (ACP) configuration manager 111 can determined a set of computing environments to provision the user-given application and provide a scaling ratio across the set of computing environments (e.g. clouds). For deploying an applicant component group (ACP), configuration manager 111 can also determine a number of load balancer instances to be up at any point in time, based on the knowledge of current and expected application load as received from clients 130A-130Z. Configuration manager 111 for deploying an application component group (ACG) can use data provided by local area A and global area B of history database (which is continually updated), as well as transaction arrival rate to regularly re-evaluate and fine tune the scaling ratio and placement ratio.

Configuration manager 111 can use computing environment obtained data of computing environments database 2121, the user inputs of applications database 2122 (Table 2), global area B of history database 2123 (Table 4) to determine the following: (i) An initial set of target computing environments (e.g. clouds) where one or more application component group (ACG) defining an application can be deployed; (ii) an initial placement ratio; (iii) The set of scaling metrics [C1 (s1,s2, . . . sx), C2 (s1, s2 . . . sx)] for each application component group per computing environment (e.g.) cloud provider, where sx consists of calculated maximum values for each of a set of parameter values (e.g. response time, throughput, CPU and memory usage) for cloud Cx and (iv) the number of load balancer instances (L). The value of load balancer instances can depend on a number of incoming transactions and other SLA metrics specified by the user and may be recalculated iteratively and periodically. For determining (i) the initial set of target computing environments, the first step in the method is to arrive at a set of target computing environments based on the runtimes and services required and their availability on various clouds referenced in Table 1

On deployment, configuration manager 111 can interface with load balancer 112 (as shown in FIGS. 1A and 1B) to instantiate the initial set of LB instances and to increase or decrease the number of LB instances at any point in time. Configuration manager 111 can also interface with determined selected computing environments selected for deployment of the application defined by application component groups (ACG) to implement the placement ratio and the scaling metrics recommendations for each selected cloud.

Embodiments herein recognize that each computing environment provider can have its own scaling policies and can have an API that can be called to setup these scaling policies. Configuration manager 111 can initially start one instance of the application component group (ACG) on each of the selected computing environments and can communicate command data to the selected computing environments to set up a scaling policy. In response to end-user transactions, each computing environment of the selected computing environments selected for deployment can then scale instances of an application component group (ACG) up or down, according to the scaling metrics and up to the limits imposed by its placement ratio.

Broker 110 by configuration manager 111 can determine an initial placement ratio at block 1106 and can determine an updated placement ratio at block 1111. An example of broker 110 determining a placement ratio is now described.

Configuration manager 111 can provide an exemplary placement ratio as follows: Placement Ratio [ACG1(C1:x, C2:y, . . . ), ACG2(C2:1,C4:m, . . . ,)]. Embodiments herein can dynamically determine the optimal placement ratio of instances of the different application component groups (ACG) defining an application on one or more computing environments of computing environments 140A-140Z. The placement ratio can be a ratio indicating the maximum number of instances of each application component group (ACG) to be placed for execution on a specific computing environment C (e.g. cloud computing provider).

Figure 5A:
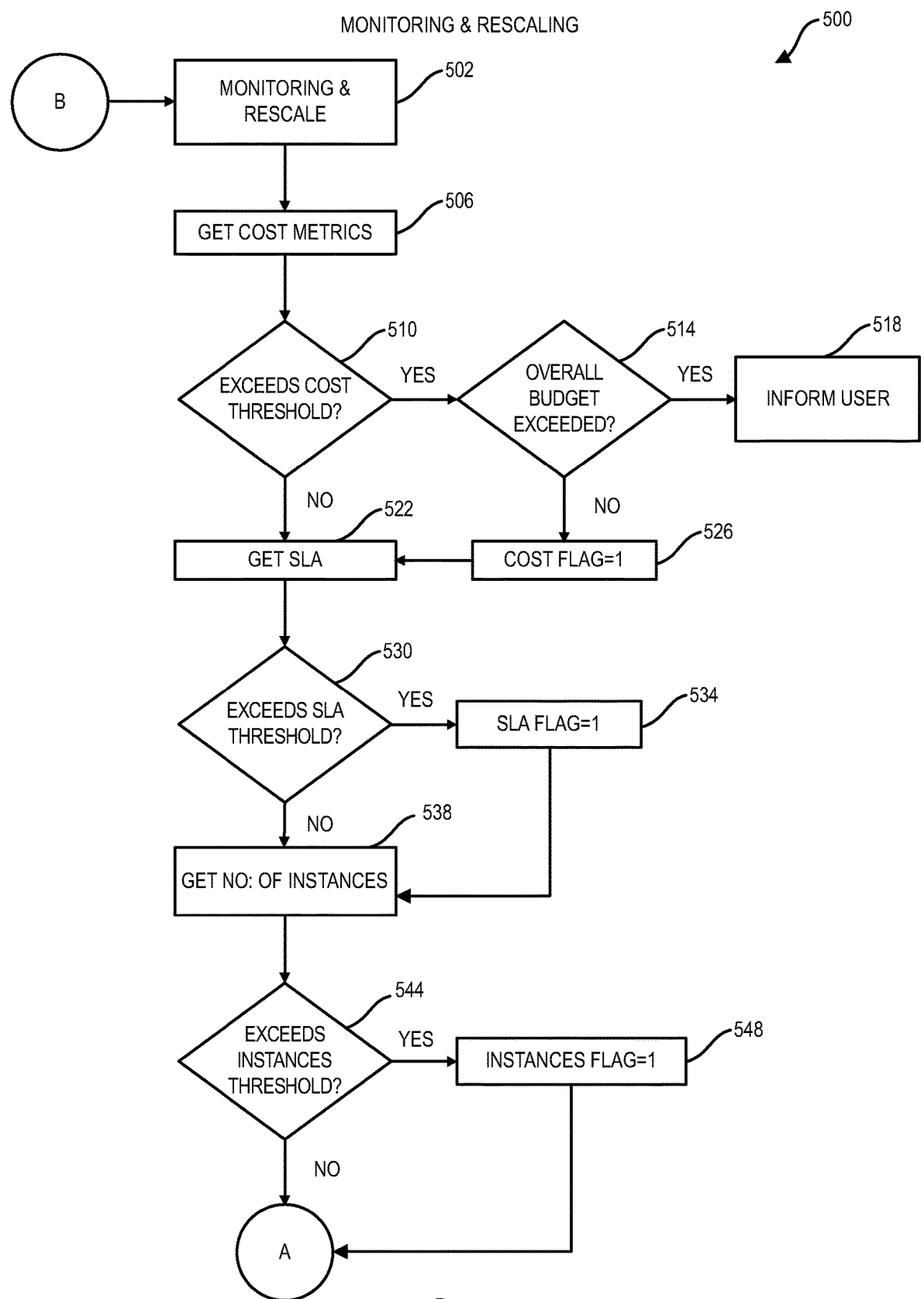
FIGS. 5A-5B depict a method for performance by a configuration manager according to one embodiment.

Configuration manager 111 can determine a Placement Ratio for initial deployment using a process as set forth in the flowchart of FIG. 5A. For determining an initial placement ratio, configuration manager 111 can use data of computing environments database 2121, applications database 2122, and global area B of monitoring data history database 2123. Subsequent to startup e.g. at iteratively performed block 1111 data of local area A can also be used for determining an iteratively and dynamically updated placement ratio.

Configuration manager 111 in reference to method 400 described in the flowchart of FIG. 4 can perform placement ratio determination as follows. Configuration manager 111 can compare data of defined application component groups (block 406) as determined from user inputs (block 402) against the available components per computing environment (e.g. cloud) as stored in computing environments database 2121 (block 414) to arrive at the initial target computing environment subset [ACG1(C1,C2, . . . Cx), ACG2(C4, . . . Cy)] that supports each of the application component groups (ACGs). Based on various computing environments (e.g. clouds) not being capable of supporting a certain application component type such computing environments can be filtered (block 410) and thus excludes from a target computing environment set for an initial deployment.

Referring to blocks 418 and 422 configuration manager 111 can use scaling metrics parameters specified by a user to filter a selected set of target computing environments for deployment of one or more application component group (ACG). Configuration manager 111 can use the scaling metric limits specified by the user for various parameters such as CPU usage, response time and throughput (applications database 2122 as defined by Table 2), can be optimized against the scaling metrics in the computing environments database 2121 as defined by Table 1, for each of the application components, for each of the computing environments, to arrive at a further filtered target computing environment subset. Embodiments herein will recognize that configuration manager 111 comparing computing environment characterizing data of computing environments database 2121 to SLA metrics of applications database 2122, configuration manager 111 may not qualify, and therefore may filter certain computing environments.

At block 418 configuration manager 111 can use the scaling metrics specified in Table 2, to narrow the determined set of computing environments obtained. For example, if the user has specified a scaling metric of "response time >5 ms", this means that if the response time of the application component takes more than 5 ms then spawn a new instance. If however a particular computing environment (e.g. cloud) does not support scaling based on response time, then configuration manager 111 can filter and exclude that computing environment from a determined set of target computing environments.

At block 426 configuration manager 111 can apply any specific user restrictions specified in Table 2, e.g. "US Geo+Any Cloud". Configuration manager 111 can thus further filter the determined set of target computing environments for deployment of one or more application component group (ACG).

Referring to block 426 and block 430, configuration manager 111 can examine restriction parameter values of applications database 2121 as defined by Table 2 to further filter the selected set of target computer environments for deployment of one or more application component group (ACG).

Referring to block 434 and block 438, and to blocks 448, 444, and 452, configuration manager 111 can determine an initial placement ratio, at block 454 can update local area A of history database with the updated placement ratio parameter values.

According to one embodiment, configuration manager 111 can determine a placement ratio using user defined priorities defined by an application provider user. Referring to applications database 2122, an administrator user can define priority parameter values for respective components defining an application component group (ACG). Priority parameter values can include e.g. availability (uptime) prior values or response time priority values.

According to one embodiment, configuration manager 111 can use a multi-objective optimization algorithm for simultaneous optimization of multiple functions, which functions can be conflicting functions. According to one embodiment, the employed multi-objective optimization algorithm (which can be a pareto algorithm) can generate pareto solutions. A function set for optimization using a multi-objective optimization algorithm can be expressed as follows.

$$F=\{f1, \ldots fn\} \quad (1)$$

Where F is the function set, where f1 is a first factor, where fn is an nth factor and where n is greater or equal to 2. According to one example, fn can be in conflict with f1. According to one example (a), fn==f2=cost and f1 can be priority parameter value of: f1=availability (uptime) >=x. According to one example (b), fn==f2=cost and f1 can be the priority parameter value of: f1=response time <=y. According to one example (c), fn==f3=cost, f1 can be a priority parameter value of: f1=availability (uptime) >=x, and f2 can be f2=response time <=y. With use of a multi-objective optimization algorithm, configuration manager 111 can identify solutions wherein a first function while a second factor is minimized. Configuration manager 111 applying (a) can identify solutions wherein availability is maximized and cost is minimized. Configuration manager 111 applying (b) can identify solutions wherein response time is maximized and cost is minimized. Configuration manager 111 applying (c) can identify solutions wherein availability is maximized, wherein response time is maximized and wherein cost is minimized. Configuration manager 111 for performance of a multi-objective optimization (pareto) algorithm can identify one or more solution to the described set of functions applying multi-objective optimization rules.

Configuration manager 111 can examine priority parameter values of applications database 2122 defined by Table 2 to identify functions for evaluation using a multi-objective algorithm and with use of identifying one or more solution to a set of functions can return a determined placement ratio for deployment of an application component group on a set of computing environments. Referring to the example set forth hereinabove wherein applications database 2122 can be defined by Table 2, configuration manager 111 can use the function set F of (a) where a user prioritizes an availability (uptime) parameter, can use the function set of (b) where a user prioritizes a response time parameter value, and can use the function set of (c) where a user prioritizes both an availability parameter value and a response time parameter value.

Examining applications database 2122 as defined by Table 2, configuration manager 111 can build the function set F for each application component group (ACG), using the specified user priority for each component. The generated function set will contain f1, f2, . . . , fn—each of which is either maximized (example f1: Availability (uptime) or minimized (example f2: Cost).

Taking the filtered subset of cloud provider options and these sets of functions, configuration manager 111 using a multi-objective optimization (e.g. pareto) algorithm can generate the ratio of computing environment provider options for each application component group (AGC), such that the placement ration will simultaneously optimize f1, f2, . . . , fn (with trade off) for each component defining an application component group (AGC). According to one embodiment, the trade-off analytics option offered with ABC-AI services from the ABC-CLOUD computing environment provider can be used for implementation.

A multi-objective optimization problem is an optimization problem that involves multiple objective functions. In mathematical terms, a multi-objective optimization problem can be formulated as follows.

$$\min(f1(x), f2(x), \ldots, fk(x)) \quad (2)$$

Such that x belongs to X, where the integer k>=2 is the number of objectives and the set X is the feasible set of decision vectors.

Embodiments herein recognize that the feasible set X can be defined by constraint functions. Embodiments herein further recognize that if some objective function is to be maximized, it is equivalent to minimize its negative.

In the context of the applications data referenced in Table 2, f1 can be, for example, availability (uptime) of different computing environment providers {uptime 97%, uptime 99% and so on as in Table 1}; f2: cost of different computing environments (e.g. cloud) providers. Accordingly, f1 and f2 can form the feasible set X each defining a constraint function that defines possible solutions for evaluation by configuration manager 111. Configuration manager 111 using a multi-objective optimization (pareto) algorithm can examine priority parameter values defined by an application provider from applications database 2122. The parameter values can form functions defining constraints, wherein solutions evaluated by configuration manager for performance of the multi-objective optimization (pareto) algorithm are in dependence on the constraints.

For performance of a multi-objective optimization (pareto) algorithm, configuration manager 111 can identify solutions wherein, a first solution dominates (pareto dominates) a second solution.

Configuration manager 111 for identification of optimized solutions can be configured to determine that feasible solution x1 that belongs to X dominates (pareto dominates) another solution x2 that belongs to X, if 1. $fi(x1) <= fi(x2)$ for all $i$ belonging to $\{1,2, \ldots, k\}$
and 2. $fj(x1) < fj(x2)$ for at least one $j$ belonging to $\{1,2, \ldots, k\}$ \quad (3)

According to one embodiment, with use of described processes, configuration manager 111 can identify dominating (pareto dominating) solutions for a set of functions evaluated using a multi-objective optimization (pareto) algorithm to select a placement ratio for an application component group (ACG) to improve performance of one more application component of the application component group (ACG) without detracting from performance of remaining components of the application component group (ACG).

As set forth herein configuration manager 111 can apply a multi-objective (pareto) algorithm for return of a placement ratio. According to one embodiment, configuration manager 111 for return of a placement ratio can apply a multi-objective (pareto) algorithm for return of a weightage ratio, can examine a defined budget parameter value data defined by a user for an application to determine a budget allocation for an application, and can return a placement ratio in dependence on the assigned weightage ratio and in dependence on the budget allocation.

Configuration manager 111 with use of the described multi-objective optimization (pareto) algorithm at block 444 can provide a weighting ratio. Configuration manager 111 can provide the assigned weightage ratio as [ACG1(C1:w1, C2:w2, . . . ,Cx:wx), ACG2(C3:w3, . . . ,Cy:wy)] which defines a weightage (%) assigned to each of the target computing environments for a particular application component group (ACG) with use of a multi-objective optimization algorithm as set forth herein in dependence on the user priorities (Table 2). Configuration manager 111 with use of the described multi-objective optimization (pareto) algorithm at block 444 can determine a further filtered and reduced target set of computing environments for deployment of an application component group (ACG).

Figure 4:
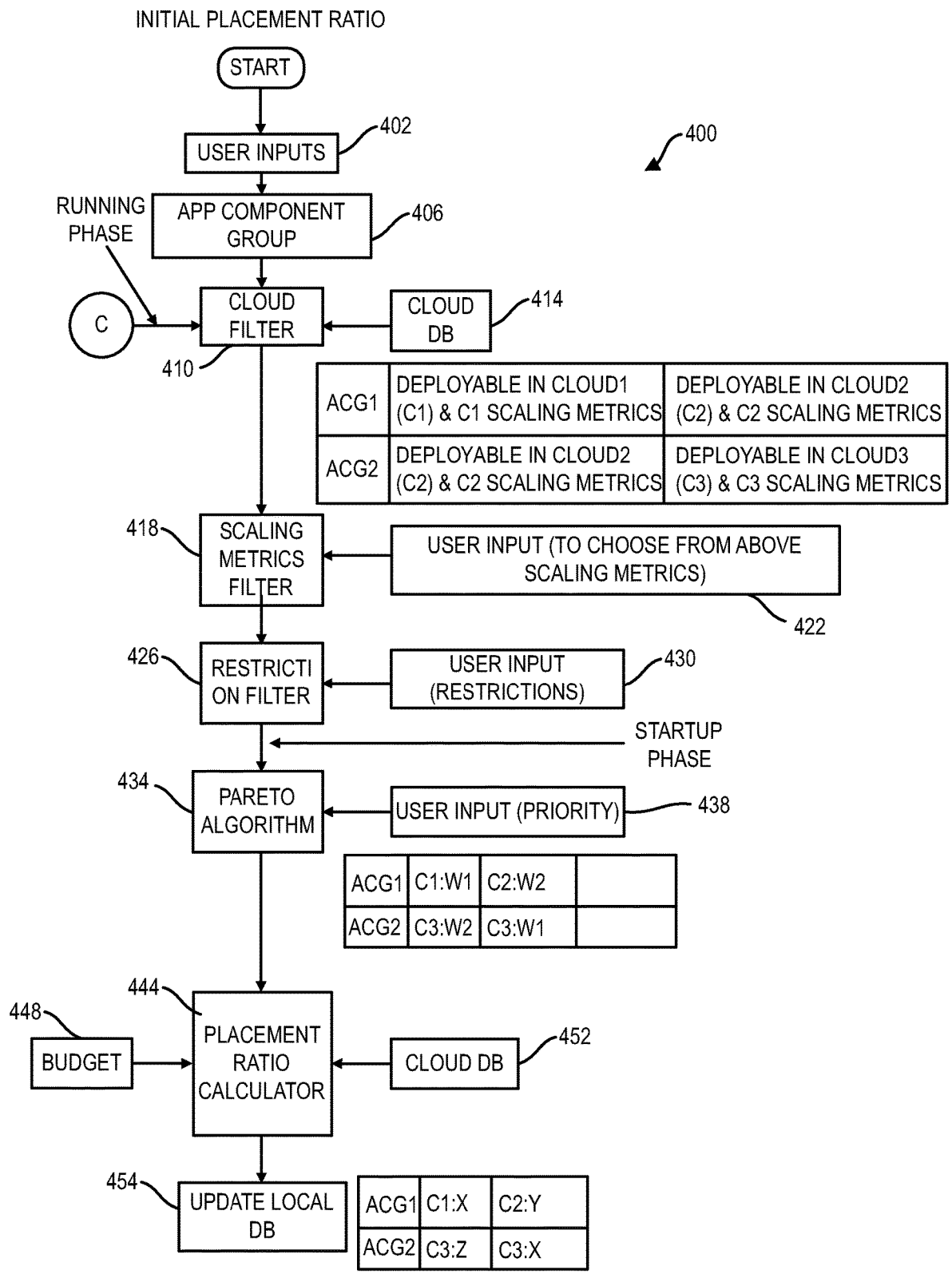
FIG. 4 depicts a method for performance by a configuration manager according to one embodiment.

Referring to block 448 of the flowchart of FIG. 4, configuration manager 111 can optimize a placement ratio for a user budget. For an initial deployment (block 1106) configuration manager 111 can optimize for a user budget as follows. In a startup phase (initial deployment), configuration manager 111 can allocate each of the application component groups defining an application an equal share of the user budget. Configuration manager 111 can use this cost (resulting from the equal share allocation) allocated to a particular ACG, the individual cost of running an instance of the application component group on a particular computing environment (e.g. cloud) (available in the computing environments database 2121) and the assigned weightage ratio determined with use of the described multi-objective optimization, to return an initial ratio of maximum number of instances of an application component group (ACG) that can be run across one or more of the its selected target clouds i.e. ACG1(C1:a,C2:b, . . . Cx:c). Configuration manager 111 accordingly can provide the initial placement ratio in the form of e.g.: [ACG1(C1:a,C2:b, . . . ), ACG2(C3:1, C4:m, . . . )]

As set forth herein a multi-objective (pareto) optimization algorithm can be applied by broker 110 by applied by choosing the "user priorities" from Table 2 on the one hand and the selected computing environments for deployment of an application. For example, if the user has specified an uptime (>=99.99%), response time of <=8 ms) and a maximum budget ($10 pm) for a specific application component, configuration manager 111 can apply the highlighted parameter values to return a weighted target set of computing environments. Use of a multi-objective (pareto) optimization algorithm can provide a weightage for each computing environment depending on the user priorities of Table 2 based on how closely it matches the user priorities.

Configuration manager 111 can return a maximum number of instances of each application component group (ACG) that can be run on a given computing environment using an equal share of a user defined "maximum budget" parameter value that can be provided in Table 2. For example if a computing environment filtering process has narrowed a selected set of computing environments to three computing environments with different weightages, configuration manager 111 can determine the cost of running each of the components of the ACG on the three computing environments assuming an equal share of the budget. Accordingly, configuration manager 111 can provide the number of instances of each ACG that can be run on each of the target computing environments.

Figure 5B:
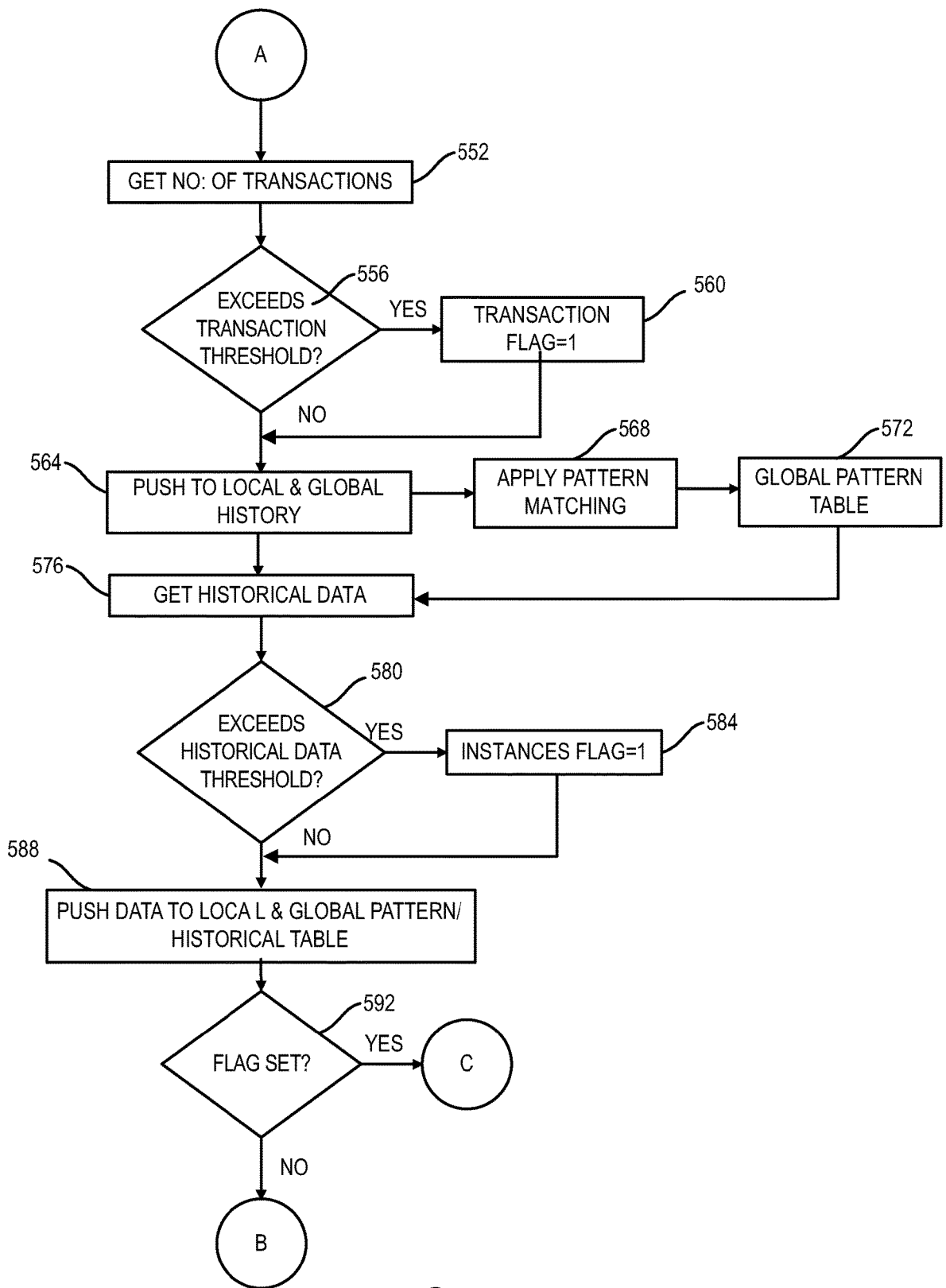

Referring to the method 500 of the flowchart of FIGS. 5A and 5B and block 1111 configuration manager 111 can iteratively recalculate a placement ratio for an application component group (ACG), and/or a set of target computing environments for deployment of an ACG after an initial deployment at block 1106. Configuration manager at block 1112 can update a placement ratio based on e.g. current utilization values for cost, instances, number of incoming transactions, and on user priorities as referenced in application database 2122 defined by Table 2. Configuration manager can thus provide an updated placement Ratio [ACG1(C1:x,C2:y, . . . ), ACG2(C3:a,C5:c, . . . )].

There is set forth herein a process for dynamically optimizing the placement ratio initially determined at block 1106. Once an application is started up at block 1403 within initial computing environments determined at block 1106 (FIG. 2) according to the recommendations provided by the initial placement ratio (FIG. 4), configuration manager 111 can examine data being collected by live monitoring of application performance and from the load balancer 112 to continuously perform monitoring and scaling as described in the flowcharts of FIGS. 5A and 5B according to one embodiment.

With reference to the flowchart of FIG. 5A and FIG. 5B, configuration manager 111 can perform monitoring and scaling (initiated at block 502) as follows. If the current cost metrics (from Table 3 defining local area A of history database 2123) exceeds the cost threshold (block 510), check if the overall user budget has been exceeded (block 514), and if so, inform the user (block 518). If the user budget has not yet been exceeded (block 514), it means a particular application component group (ACG) has exceeded its allocated budget by becoming costly to run on one or more of its target computing environments (e.g. clouds), save this information and set the cost exceeded flag (block 534).

If one or more of the current SLA metrics (from Table 3 defining local area A of history database 2123) have exceeded the user SLA thresholds (block 530), save this information and set the SLA exceeded flag (block 534).

If the number of application component group instances on one or more of the computing environments (e.g. clouds) on which an ACG is running has exceeded the set instance threshold (determined by the current value of the placement ratio) (block 544), set the instance threshold exceeded flag (block 548).

If the incoming transaction rate (which can be determined from a data report received from load balancer 112 at block 552) exceeds the transaction threshold (block 552), set the transactions exceeded flag (block 560).

At block 564, configuration manager 111 can save all of the above collected information into the local area A and global area B of history database 2123 defined by Tables 3 and 4 herein.

At block 568 configuration manager 111 can analyze the historical data in the global area B of History database 2123 for any patterns such as time dependent patterns, and can store any identified time based patterns into a global patterns table, and example of which has been described in reference to Table 5. Configuration manager 111 performing block 568 and block 572 can include configuration manager training and querying a predictive model stored in predictive models area 2126 as set forth in connection with Table 5 herein.

At block 580 configuration manager 111 can examine the local area A of history database 2123, global area B of history database and/or the global patterns table e.g. as represented by Table 5, and if any recommended course corrections are identified, set a history flag (block 584). At block 588 configuration manager 111 can push resulting data to local area A and global area B of history database 2123 and to global patterns Table 5. Configuration manager 111 can set history flag at block 584 according to a variety of different scenarios. According to one example, configuration manager can 111 can examine global patterns Table 5 to determine whether a computing environment on which a current application component group is currently deployed has a recorded time period of interest for a component matching a component of deployed application component group in the global patterns Table 5 and whether that time period interest is in common with a current time period or next time period successive to the current time period. Where configuration manager 111 identifies a computing environment within global patterns Table 5 on which a current application component group is currently deployed and where a time period of interest for that computing environment for a component matching a component of the current application component group is in common with a current time period or next time period, configuration manager 111 can re-perform the calculations of block 510 and block 530 biasing the Table 3 parameter values examined (e.g. current cost utilization, current response time, and/or utilization) at block 510 and block 530 in dependence to the predicted performance parameter values specified in global patterns Table 5. Where a predicted performance of a computing environment for a certain component according to the global patterns Table 5 is superior to the observed performance of Table 3, the Table 3 values can be biased to values indicative of improved performance. Where a predicted performance of a computing environment for a certain component according to the global patterns Table 5 is inferior to the observed performance of Table 3, the Table 3 values can be biased to values indicative of degraded performance. Configuration manager 111 can select biasing values in proportion to and in dependence on differences between parameter values of Table 3 and Table 5. Where configuration manger 111 performing the described recalculation of determination blocks 510 and 530 determines that the flag of block 526 and/or block 534 would have been raised with the described biased parameter values, configuration manager 111 can set the history flag at block 592.

Broker 110 can be configured so that if any of the above flags of the flowchart of FIGS. 5A and 5B are set (cost threshold flag, SLA threshold flag, instances threshold flag, transactions flag, history flag) configuration manager 111 calls the placement ratio determination process (C path) to recalculate the placement ratio, e.g. using the multi-objective optimization (pareto) algorithm described in connection with the flowchart of FIG. 4 (live path C). Configuration manager 111 by calling the C path of FIG. 4 can also or alternatively filter selected computing environments. According to one embodiment, broker 110 can be configured so that if two or more of A (and in one embodiment each of) the above flags of the flowchart of FIGS. 5A and 5B are set (cost threshold flag, SLA threshold flag, instances threshold flag, transactions flag, history flag) configuration manager 111 calls the placement ratio determination process (C path) to recalculate the placement ratio, e.g. using the multi-objective optimization (pareto) algorithm described in connection with the flowchart of FIG. 4 (live path C). Configuration manager 111 by calling the C path of FIG. 4 can also or alternatively filter selected computing environments. Evaluating by configuration manager 111 at block 1111 can include configuration manager 111 performing the stages described in the flowcharts of FIGS. 5A and 5B to determine whether a condition for adjusting a set of computing environments and/or a placement ratio is satisfied.

Referring to live path C of FIG. 4, configuration manager 111 can be configured so that in the case that examination of global patterns Table 5 results in a history flag (block 592) being set and leads to branching from Fig. B, configuration manager 111 for performance of the stages of the flowchart of FIG. 4 can bias parameter values of computing environments database 2121 defined by Table 1, and history database 2123 defined by Table 3 and Table 4 in dependence on parameter values that are specified in global patterns Table 5. Configuration manager 111 can bias parameter values of Table 1, Table 3, and Table 4 using parable values of Table 5 in the manner described for biasing parameter values of Table 3 using parameter values of Table 5. Configuration manager 111 can bias parameter values of Tables 1, 3, and 4 having specified computing environments and components matching those that are specified in global patterns Table 5, where a time period of interest of the global patterns Table 5 is in common with a current time period or next time period. As set forth herein configuration manager 111 can examine parameter values of Table 1, Table 3 and Table 4 for determining of an updated set of target computing environments for deployment of an application component group (ACG) in accordance with the flowchart of FIG. 4, configuration manager 111 can examine parameter values of Table 1, Table 3 and Table 4 for determining of an updated placement ration for placement of instances of an application component group (ACG) amongst selected computing environments in accordance with the flowchart of FIG. 4. Accordingly, embodiments herein recognize that the identification of a global pattern, can result in filtering of a certain computing environment from a set of target computing environments, can result in adding of a computing environment to a set of selected target computing environments, and can impact a placement ratio for placing an application component group (ACG) amongst selected target computing environments for deployment of an application component group (ACG).

Certain embodiments herein may offer various technical computing advantages involving computing advantages to address problems arising in the realm of computer system and computer networks, particularly in the realm of computer networks comprising multiple computing environments in which application component groups (ACGs) can be deployed. Embodiments herein can include use of a artificial intelligence (AI) processes for deployment of an application component group (ACG) on a set of computing environments and for determination of a placement ratio of an application component group (ACG) on a set of selected combining environments. Embodiments herein can include monitoring of performance data of computing environments and iteratively adjusting a set of target computing environments, and/or a placement ratio in dependence on the monitoring. Embodiments herein can include establishing a history database that stores monitoring data of multiple application component groups (ACGs) of different application providers miming on different computing environments and iteratively adjusting a set of target computing environments, and/or a placement ratio in dependence on an examining of data from the history database. Embodiments herein can include examining the history database to identify patterns and iteratively adjusting a set of target computing environments, and/or a placement ratio in dependence on the identified patterns.

Figure 6:
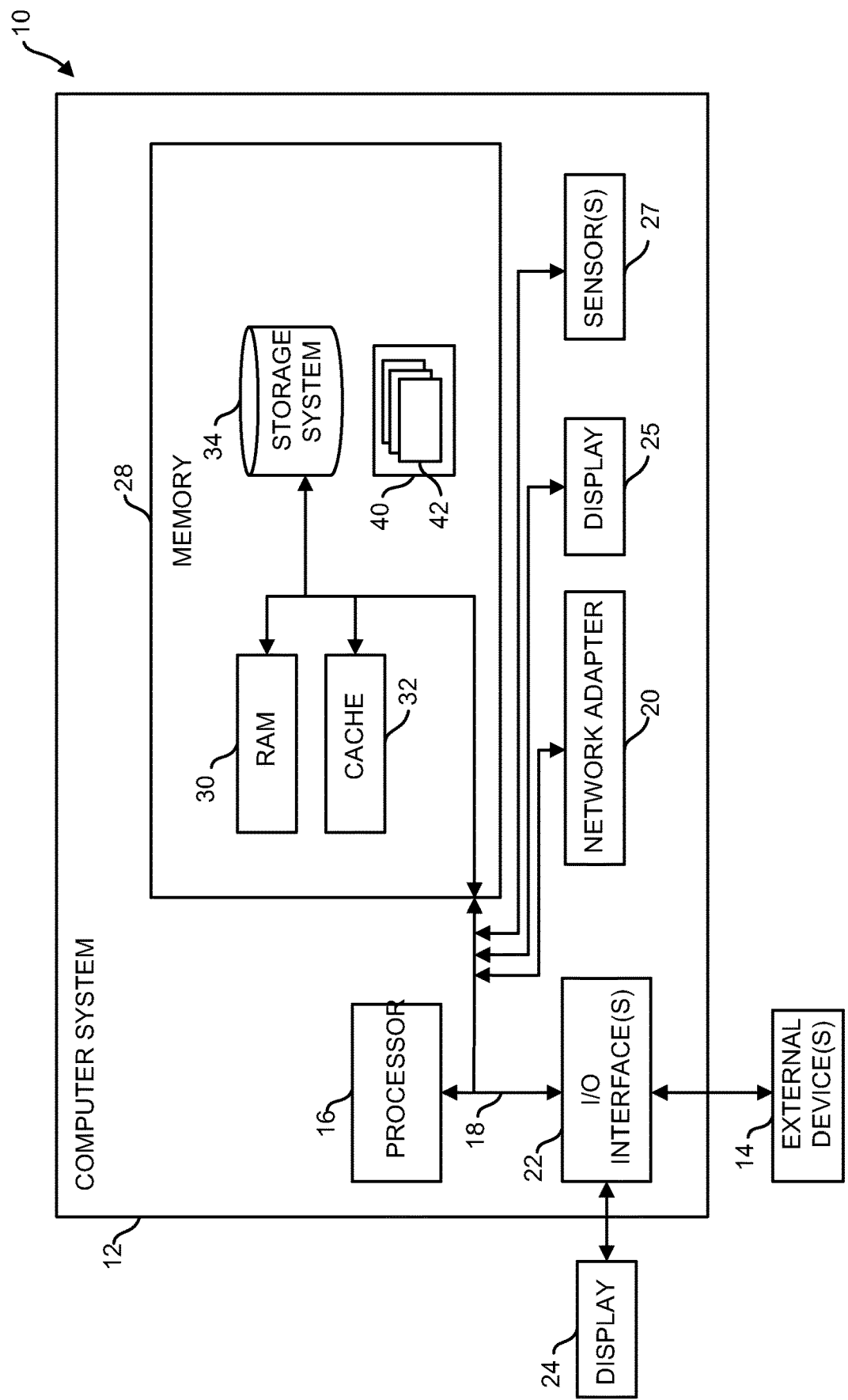
FIG. 6 depicts a computing node according to one embodiment.
Figure 7:
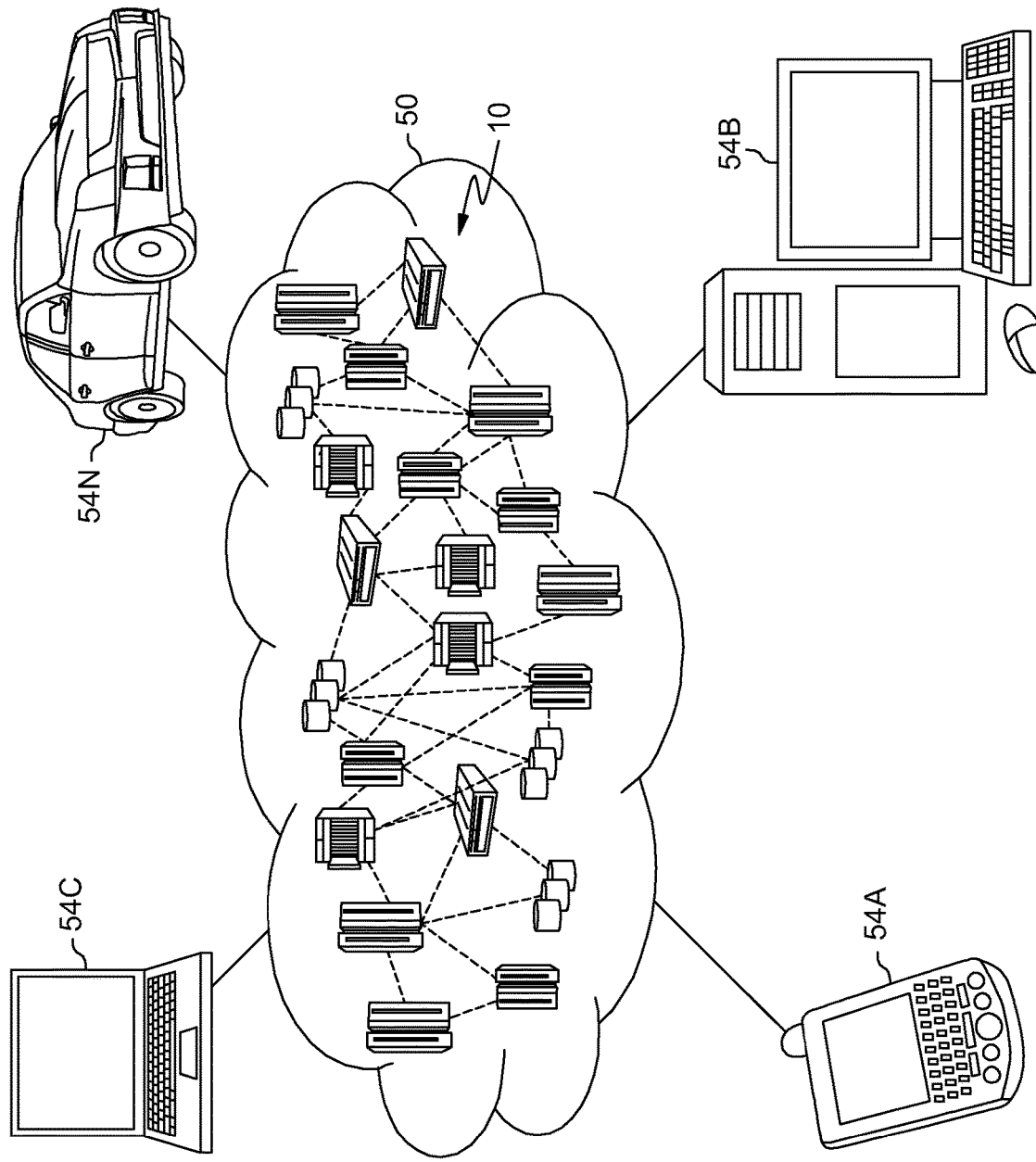
FIG. 7 depicts a cloud computing environment according to one embodiment.
Figure 8:
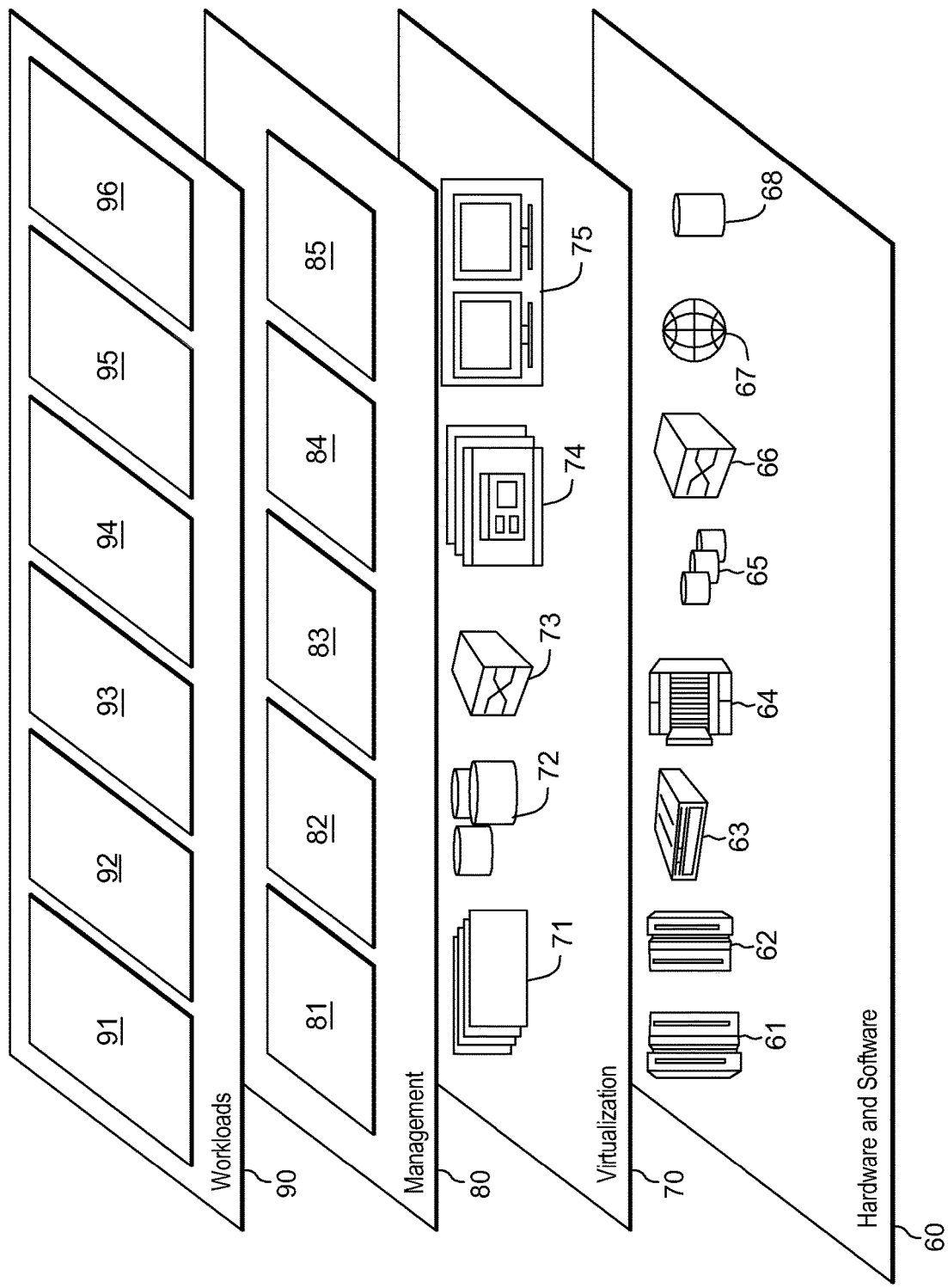
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, broker 110 can include one or more computing node 10 and can include one or more program 40 for performing functions described with reference to the flowchart of FIG. 4, functions described with reference to the flowchart of FIG. 5A, functions described with reference to the flowchart of FIG. 5B, and functions described with reference to broker 110 as set forth in the flowchart of FIG. 2. In one embodiment, administrator client computer devices of administrator client computer devices 120A-120Z can include one or more computing node 10 and can include one or more program 40 for performing functions described with reference to administrator client computer devices administrator client computer device 120A-120Z as set forth in the flowchart of FIG. 2. In one embodiment, computing environments of computing environments 120A-120Z can include one or more computing node 10 and can include one or more program 40 for performing functions described with reference to computing environments of computing environments 120A-120Z as set forth in the flowchart of FIG. 2. In one embodiment, the computing node based systems and devices depicted in FIG. 1A and FIG. 1B can include one or more program 40 for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (Fig.)

is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for application placing and scaling as set forth herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising:
    obtaining from a plurality of computing environments computing environment characterizing data;
    obtaining application parameter data defined by an application provider, the application parameter data specifying attributes of an application component group defining an application, wherein the application parameter data includes group membership specifying data that specifies that certain application components are to be deployed as a group in a common computing environment;
    determining, in dependence on data of the computing environment characterizing data and data of the application parameter data, a set of computing environments for deployment of the application component group, and a placement ratio for the application component group, wherein the placement ratio specifies a limit of a number of instances of the application component group on respective computing environments of the set of computing environments;
    deploying the application component group on the determined set of computing environments, wherein the deploying includes sending to the determined set of computing environments command data that specifies the determined placement ratio;
    iteratively obtaining, subsequent to the deploying, application performance monitoring data from the determined set of computing environments of the plurality of computing environments in which instances of the application component group have been deployed; and
    iteratively adjusting the placement ratio for the application component group between computing environments of the determined set of computing environments in dependence on the iteratively obtained monitoring data.

2. The computer implemented method of claim 1, wherein the method includes iteratively adjusting the determined set of computing environments for deployment of the application component group in dependence on data of the monitoring data.

3. The computer implemented method of claim 1, wherein the method includes iteratively providing data of the monitoring data to global area of a history database that includes historical monitoring data of second to Nth application component groups which have been deployed respectively in second to Nth sets of computing environments of the plurality of computing environments, wherein the iteratively adjusting the placement ratio for the application component group between computing environments of the determined set of computing environments includes performing the iteratively adjusting the placement ratio for the application component group between computing environments of the plurality of computing environments in dependence on data of the historical monitoring data of second to Nth application component groups which have been deployed respectively in second to Nth sets of the computing environments of the plurality of computing environments.

4. The computer implemented method of claim 1, wherein the method includes iteratively providing data of the monitoring data to global area of a history database that includes historical monitoring data of second to Nth application component groups of respective second to Nth application providers which have been deployed respectively in second to Nth sets of the computing environments of the plurality of computing environments, wherein the iteratively adjusting the placement ratio for the application component group between computing environments of the determined set of computing environments includes performing the iteratively adjusting the placement ratio for the application component group between computing environments of the plurality of computing environments in dependence on data of the historical monitoring data of second to Nth application component groups which have been deployed respectively in second to Nth sets of the computing environments of the plurality of computing environments.

5. The computer implemented method of claim 1, wherein the iteratively adjusting the placement ratio includes using a multi-objective optimization algorithm.

6. The computer implemented method of claim 1, wherein the iteratively adjusting the placement ratio includes identifying an optimized solution for a set of functions using a multi-objective optimization algorithm, and wherein one or more function of the set of function is provided using data of the application parameter data.

7. The computer implemented method of claim 1, wherein the method includes iteratively providing data of the monitoring data to global area of history database that includes historical monitoring data of second to Nth application component groups which have been deployed respectively in second to Nth sets of the computing environments of the plurality of computing environments, wherein the method includes examining data of the historical monitoring data of the second to Nth application component groups to populate a global patterns database with time period of interest data for computing environments of the plurality of computing environments, the time period of interest data specifying that the computing environment is predicted to exhibit a certain performance characteristic for a certain time period, wherein the iteratively adjusting the placement ratio for the application component group between computing environments of the determined set of computing environments includes performing the iteratively adjusting the placement ratio for the application component group between computing environments of the plurality of computing environments in dependence on data of the time period of interest data of the global patterns database.

8. The computer implemented method of claim 1, wherein the method includes iteratively providing data of the monitoring data to a global area of a history database that includes historical monitoring data of second to Nth application component groups which have been deployed respectively in second to Nth sets of the computing environments of the plurality of computing environments, wherein the method includes examining data of the historical monitoring data of the second to Nth application component groups to populate a global patterns database with time period of interest data for computing environments of the plurality of computing environments, the time period of interest data specifying that a computing environment is predicted to exhibit a certain performance characteristic for a certain time period, wherein the iteratively adjusting the placement ratio for the application component group between computing environments of the determined set of computing environments includes performing the iteratively adjusting the placement ratio for the application component group between computing environments of the plurality of computing environments in dependence on data of the time period of interest data of the global patterns database.

9. The computer implemented method of claim 1, wherein the method includes iteratively providing data of the monitoring data to a global area of a history database that includes historical monitoring data of second to Nth application component groups which have been deployed respectively in second to Nth sets of the computing environments of the plurality of computing environments, wherein the method includes examining data of the historical monitoring data of the second to Nth application component groups to populate a global patterns database with time period of interest data for computing environments of the plurality of computing environments, the time period of interest data specifying that a computing environment is predicted to exhibit a certain performance characteristic for a certain time period, wherein the iteratively adjusting the placement ratio for the application component group between computing environments of the determined set of computing environments includes performing the iteratively adjusting the placement ratio for the application component group between computing environments of the plurality of computing environments in dependence on data of the time period of interest data of the global patterns database.

10. The computer implemented method of claim 1, wherein the method includes examining data of global area of a history database that stores historical monitoring data of a second application component group of a second application provider and historical monitoring data of the application component group of the application provider, wherein the method includes examining data of the historical monitoring data to identify a global pattern, the global pattern being in dependence on the historical monitoring data of the second application component group of the second application provider, wherein the iteratively adjusting the placement ratio for the application component group between computing environments of the determined set of computing environments includes adjusting the placement ratio for the application component group between computing environments of the determined set of computing environments in dependence on the identified global pattern.

11. The computer implemented method of claim 1, wherein the method includes examining data of global area of a history database that stores historical monitoring data of a second application component group of a second application provider and historical monitoring data of the application component group of the application provider, wherein the method includes examining data of the historical monitoring data to identify a global time dependent pattern, the global time dependent pattern being in dependence on the historical monitoring data of the second application component group of the second application provider, wherein the iteratively adjusting the placement ratio for the application component group between computing environments of the determined set of computing environments includes adjusting the placement ratio for the application component group between computing environments of the determined set of computing environments in dependence on the identified global pattern, and wherein the method includes adjusting the set of computing environments for deployment of the application component group in dependence on the global time dependent pattern.

12. The computer implemented method of claim 1, wherein the application parameter data includes user priority parameter data of the application provider that specifies one or more performance parameter value that has been prioritized by the application provider, wherein the method includes using the user priority parameter data to establish a first function of a set of functions, wherein the method includes evaluating the set of functions using a multi-objective optimization (pareto) algorithm, and wherein the method includes performing the iteratively adjusting the placement ratio for the application component group between computing environments of the determined set of computing environments in dependence on a result of the evaluating.

13. The computer implemented method of claim 1, wherein the application parameter data includes user priority parameter data of the application provider that specifies first and second performance parameter values that have been prioritized by the application provider, wherein the first performance parameter value is a response time performance parameter value, wherein the second performance parameter value is an availability performance parameter value, wherein the method includes using the first performance parameter value to establish a first function of a set of functions, and using the second performance parameter value to establish a second function of a set of functions, wherein the set of functions included a third function provided by a cost function, and wherein the method includes evaluating the set of functions using a multi-objective optimization (pareto) algorithm, and wherein the method includes performing the iteratively adjusting the placement ratio for the application component group between computing environments of the determined set of computing environments in dependence on a result of the evaluating.

14. A computer program product comprising:
a computer readable storage medium readable by one or more processing unit and storing instructions for execution by one or more processor for performing a method for automated package delivery planning, comprising:
obtaining from a plurality of computing environments computing environment characterizing data;
obtaining application parameter data defined by an application provider, the application parameter data specifying attributes of an application component group defining an application, wherein the application parameter data includes group membership specifying data that specifies that certain application components are to be deployed as a group in a common computing environment;
determining, in dependence on data of the computing environment characterizing data and data of the application parameter data, a set of computing environments for deployment of the application component group, and a placement ratio for the application component group, wherein the placement ratio specifies a limit of a number of instances of the application component group on respective computing environments of the set of computing environments;
deploying the application component group on the determined set of computing environments, wherein the deploying includes sending to the determined set of computing environments command data that specifies the determined placement ratio;
iteratively obtaining, subsequent to the deploying, application performance monitoring data from the determined set of computing environments of the plurality of computing environments in which instances of the application component group have been deployed; and
iteratively adjusting the placement ratio for the application component group between computing environments of the determined set of computing environments in dependence on the iteratively obtained monitoring data.

15. The computer program product of claim 14, wherein the method includes iteratively adjusting the determined set of computing environments for deployment of the application component group in dependence on data of the monitoring data.

16. The computer program product of claim 14, wherein the method includes iteratively providing data of the monitoring data to global area of history database that includes historical monitoring data of second to Nth application component groups which have been deployed respectively in second to Nth sets of the computing environments of the plurality of computing environments, wherein the method includes examining data of the historical monitoring data of the second to Nth application component groups to populate a global patterns database with time period of interest data for computing environments of the plurality of computing environments, the time period of interest data specifying that the computing environment is predicted to exhibit a certain performance characteristic for a certain time period, wherein the iteratively adjusting the placement ratio for the application component group between computing environments of the determined set of computing environments includes performing the iteratively adjusting the placement ratio for the application component group between computing environments of the plurality of computing environments in dependence on data of the time period of interest data of the global patterns database.

17. The computer program product of claim 14, wherein the application parameter data includes user priority parameter data of the application provider that specifies first and second performance parameter values that have been prioritized by the application provider, wherein the first performance parameter value is a response time performance parameter value, wherein the second performance parameter value is an availability performance parameter value, wherein the method includes using the first performance parameter value to establish a first function of a set of functions, and using the second performance parameter value to establish a second function of a set of functions, wherein the set of functions included a third function provided by a cost function, and wherein the method includes evaluating the set of functions using a multi-objective optimization (pareto) algorithm, and wherein the method includes performing the iteratively adjusting the placement ratio for the application component group between computing environments of the determined set of computing environments in dependence on a result of the evaluating.

18. The computer program product of claim 14, wherein the method includes examining data of global area of a history database that stores historical monitoring data of a second application component group of a second application provider and historical monitoring data of the application component group of the application provider, wherein the method includes examining data of the historical monitoring data to identify a global time dependent pattern, the global time dependent pattern being in dependence on the historical monitoring data of the second application component group of the second application provider, wherein the iteratively adjusting the placement ratio for the application component group between computing environments of the determined set of computing environments includes adjusting the placement ratio for the application component group between computing environments of the determined set of computing environments in dependence on the identified global pattern, and wherein the method includes adjusting the set of computing environments for deployment of the application component group in dependence on the global time dependent pattern, wherein the application parameter data includes user priority parameter data of the application provider that specifies first and second performance parameter values that have been prioritized by the application provider, wherein the first performance parameter value is a response time performance parameter value, wherein the second performance parameter value is an availability performance parameter value, wherein the method includes using the first performance parameter value to establish a first function of a set of functions, and using the second performance parameter value to establish a second function of a set of functions, wherein the set of functions included a third function provided by a cost function, and wherein the method includes evaluating the set of functions using a multi-objective optimization (pareto) algorithm, and wherein the method includes performing the iteratively adjusting the placement ratio for the application component group between computing environments of the determined set of computing environments in dependence on a result of the evaluating.

19. A system comprising:
a memory;
at least one processor in communication with the memory; and
program instructions executable by one or more processor via the memory to perform a method for automated package delivery planning, comprising:
obtaining from a plurality of computing environments computing environment characterizing data;
obtaining application parameter data defined by an application provider, the application parameter data specifying attributes of an application component group defining an application, wherein the application parameter data includes group membership specifying data that specifies that certain application components are to be deployed as a group in a common computing environment;
determining, in dependence on data of the computing environment characterizing data and data of the application parameter data, a set of computing environments for deployment of the application component group, and a placement ratio for the application component group, wherein the placement ratio specifies a limit of a number of instances of the application component group on respective computing environments of the set of computing environments; and
deploying the application component group on the determined set of computing environments, wherein the deploying includes sending to the determined set of computing environments command data that specifies the determined placement ratio.

20. The system of claim 19, wherein the method includes iteratively adjusting the determined set of computing environments for deployment of the application component group in dependence on data of the monitoring data.

\* \* \* \* \*